United States Patent
Mukasa

(10) Patent No.: US 11,308,705 B2
(45) Date of Patent: Apr. 19, 2022

(54) DISPLAY CONTROL DEVICE, DISPLAY CONTROL METHOD, AND PROGRAM

(71) Applicant: RAKUTEN GROUP, INC., Tokyo (JP)

(72) Inventor: Tomoyuki Mukasa, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 223 days.

(21) Appl. No.: 16/499,207

(22) PCT Filed: Mar. 29, 2017

(86) PCT No.: PCT/JP2017/013040
§ 371 (c)(1),
(2) Date: Sep. 27, 2019

(87) PCT Pub. No.: WO2018/179176
PCT Pub. Date: Oct. 4, 2018

(65) Prior Publication Data
US 2020/0027281 A1    Jan. 23, 2020

(51) Int. Cl.
*G06T 19/20* (2011.01)
*G06T 7/246* (2017.01)
(Continued)

(52) U.S. Cl.
CPC .............. *G06T 19/20* (2013.01); *G06T 7/246* (2017.01); *G06T 7/70* (2017.01); *G06T 19/006* (2013.01); *G06T 2200/04* (2013.01)

(58) Field of Classification Search
CPC .......... G06T 19/20; G06T 7/70; G06T 19/006
See application file for complete search history.

(56) References Cited

U.S. PATENT DOCUMENTS

2011/0187726 A1   8/2011   Suto et al.
2013/0215230 A1*  8/2013   Miesnieks ............. G06T 19/006
                                                    348/46
(Continued)

FOREIGN PATENT DOCUMENTS

JP      2011-159163 A    8/2011
WO      2014160342 A1   10/2014

OTHER PUBLICATIONS

Andrew J.Davison, "Real-Time Simultaneous Localization and Mapping with a Single Camera", Proceedings of the 9th IEEE International Conference on Computer Vision vol. 2, 2003, pp. 1403-1410.

(Continued)

*Primary Examiner* — Samantha (Yuehan) Wang
(74) *Attorney, Agent, or Firm* — HEA Law PLLC

(57) ABSTRACT

Acquisition means of a display control device acquires taken images taken at a predetermined frame rate by image taking means, which is movable in a real space. First display control means estimates a current position and orientation of the image taking means based on the taken images, and combines a virtual image with one of the taken images to be displayed, the virtual image showing a view of a virtual three-dimensional object as seen from a virtual viewpoint based on a result of the estimation. Second display control means processes, in a frame subsequent to a frame on which the first display control means has performed display control, the virtual image based on movement information on a movement of the image taking means, and combines the processed virtual image with another one of the taken images to be displayed.

16 Claims, 16 Drawing Sheets

(51) Int. Cl.
    *G06T 7/70*           (2017.01)
    *G06T 19/00*        (2011.01)

(56) References Cited

U.S. PATENT DOCUMENTS

| | | |
|---|---|---|
| 2015/0092048 A1 | 4/2015 | Brunner et al. |
| 2016/0035139 A1* | 2/2016 | Fuchs ................ G06T 7/60 345/633 |
| 2019/0197786 A1* | 6/2019 | Molyneaux ............ G06T 1/60 |

OTHER PUBLICATIONS

Georg Klein et al.: "Parallel Tracking and Mapping for Small AR Workspaces", Mixed and Augmented Reality, 2007. ISMAR 2007. 6th IEEE and ACM International Symposium on, 2007, pp. 1-10.
The Search Report dated Oct. 7, 2020, for corresponding EP Patent Application No. 17903869.0.

* cited by examiner

DISPLAY CONTROL DEVICE, DISPLAY CONTROL METHOD, AND PROGRAM

CROSS REFERENCE TO RELATED APPLICATIONS

This application is a National Stage of International Application No. PCT/JP2017/013040 filed on Mar. 29, 2017. The contents of the above document is incorporated herein by reference in its entirety.

TECHNICAL FIELD

The present invention relates to a display control device, a display control method, and a program.

BACKGROUND ART

In recent years, there has been known a technology in which a taken image, which is taken of a real space by a camera, and a virtual image, which shows a virtual three-dimensional object, are combined with each other to provide augmented reality. For example, there has also been known a technology in which a special marker is printed on paper, for example, and an image of the marker is taken by the camera to estimate a position and an orientation of the camera and control a virtual viewpoint in a virtual space.

Moreover, for example, in Non Patent Literature 1 and Patent Literature 1, there is described a technology called simultaneous localization and mapping (SLAM), in which a current position and orientation of a camera are estimated based on a change of a feature point in taken images. For example, when a computer configured to provide augmented reality displays in real time taken images taken at a predetermined frame rate, and controls the virtual viewpoint to make the same move as that of the camera with the use of the SLAM, the position and the orientation of the camera can be estimated without the use of the marker.

CITATION LIST

Non-Patent Literature

[NPL 1] Andrew J. Davison, "Real-Time Simultaneous Localization and Mapping with a Single Camera", Proceedings of the 9th IEEE International Conference on Computer Vision Volume 2, 2003, pp. 1403-1410

Patent Literature

[PTL 1] JP 2011-159163 A

SUMMARY OF INVENTION

Technical Problem

However, in the related-art technology, it is required to perform processing of estimating the position and the orientation of the camera with the use of the SLAM for each frame. This processing is processing that requires a large amount of computation, and thus imposes a high processing load on the computer configured to provide the augmented reality. Therefore, a computer having low performance may be too slow for the processing, and there are possibilities that update of the virtual image may be late to reduce smoothness of the display, and that appearance of the virtual three-dimensional object may not be changed and may become unnatural even when the camera is moved to change appearance of a subject, for example.

The present invention has been made in view of the above-mentioned problem, and therefore has an object to reduce a processing load on a computer configured to provide augmented reality.

Solution to Problem

In order to solve the above-mentioned problem, a display control device according to one embodiment of the present invention includes: acquisition means for acquiring taken images taken at a predetermined frame rate by image taking means, which is movable in a real space; first display control means for estimating a current position and orientation of the image taking means based on the taken images, and combining a virtual image with one of the taken images to be displayed, the virtual image showing a view of a virtual three-dimensional object as seen from a virtual viewpoint based on a result of the estimation; and second display control means for processing, in a frame subsequent to a frame on which the first display control means has performed display control, the virtual image based on movement information on a movement of the image taking means, and combining the processed virtual image with another one of the taken images to be displayed.

In one aspect of the present invention, first display control frames are repeatedly received for a plurality of times, the first display control frames are frames on which the first display control means performs the display control, and at least one second display control frame is set after each of the first display control frames, the at least one second display control frame is a frame on which the second display control means performs display control.

In one aspect of the present invention, the second display control means is configured to process the virtual image generated based on a latest one of the first display control frames, which repeatedly come a plurality of times, based on the movement information on a movement of the image taking means from the latest one of the first display control frames.

In one aspect of the present invention, the second display control means is configured to acquire the movement information based on a change of a feature point in the taken images.

In one aspect of the present invention, the second display control means is configured to set an area corresponding to a display position of the virtual image in the taken images as an extraction target for the feature point.

In one aspect of the present invention, the second display control means is configured to acquire the movement information based on at least one of a detection result of a sensor configured to detect a change in position of the image taking means, and a detection result of a sensor configured to detect a change in orientation of the image taking means.

In one aspect of the present invention, first display control frames are repeatedly received a plurality of times, the first display control frames are frames on which the first display control means performs the display control, at least one second display control frame is set after each of the first display control frames, the at least one second display control frame is a frame on which the second display control means performs di splay control, and the second display control means is configured to acquire the movement information based on changes in estimation results of a position and an orientation of the image taking means by the first display control means.

In one aspect of the present invention, the second display control means is configured to further determine a display position of the processed virtual image based on the movement information, and display the processed virtual image at the display position.

In one aspect of the present invention, the first display control means is configured to estimate the current position and orientation of the image taking means based further on at least one of a detection result of a sensor configured to detect a change in position of the image taking means, and a detection result of a sensor configured to detect a change in orientation of the image taking means.

In one aspect of the present invention, the acquisition means is configured to acquire in real time the taken images taken by the image taking means, the first display control means is configured to combine one of the taken images acquired in real time and the virtual image with each other so that the combined image can be displayed, and the second display control means is configured to combine another one of the taken images acquired in real time and the processed virtual image with each other so that the combined image can be displayed.

In one aspect of the present invention, first display control frames are repeatedly received a plurality of times, the first display control frames are frames on which the first display control means performs the display control, at least one second display control frame is set after each of the first display control frames, and a number of second display control frames is variable, the at least second display control frame is a frame on which the second display control means performs display control, and a number of second display control frames is variable, and the display control device further includes determination means for determining a frequency at which the first display control frames come based on a predetermined condition.

In one aspect of the present invention, a plurality of the virtual three-dimensional objects are arranged in the virtual space, the frequency at which the first display control frames come is variable for each of the virtual three-dimensional objects, and the determination means is configured to determine the frequency at which the first display control frames come for each of the virtual three-dimensional objects based on a position of the each of the virtual three-dimensional objects.

In one aspect of the present invention, the first display control means is configured to generate the virtual image that is larger than each of the taken images, and the second display control means is enabled to process and display a portion of the virtual image that is not displayed in the display control performed by the first display control means.

In one aspect of the present invention, the real space is inside of a room, the taken images are taken of a view of the inside of the room, the virtual three-dimensional object is virtual furniture, and the virtual image is an image that shows a view of the virtual furniture as seen from the virtual viewpoint.

A display control method according to one embodiment of the present invention includes: an acquisition step of acquiring taken images taken at a predetermined frame rate by image taking means, which is movable in a real space; a first display control step of estimating a current position and orientation of the image taking means based on the taken images, and combining a virtual image with one of the taken images to be displayed, the virtual image showing a view of a virtual three-dimensional object as seen from a virtual viewpoint based on a result of the estimation; and a second display control step of processing, in a frame subsequent to a frame on which display control has been performed in the first display control step, the virtual image based on movement information on a movement of the image taking means, and combining the processed virtual image with another one of the taken images to be displayed.

A program according to one embodiment of the present invention causes a computer to function as: acquisition means for acquiring taken images taken at a predetermined frame rate by image taking means, which is movable in a real space; first display control means for estimating a current position and orientation of the image taking means based on the taken images, and combining a virtual image with one of the taken images to be displayed, the virtual image showing a view of a virtual three-dimensional object as seen from a virtual viewpoint based on a result of the estimation; and second display control means for processing, in a frame subsequent to a frame on which the first display control means has performed display control, the virtual image based on movement information on a movement of the image taking means, and combining the processed virtual image with another one of the taken images to be displayed.

Advantageous Effects of Invention

According to the present invention, the processing load on the computer configured to provide augmented reality is reduced.

DESCRIPTION OF EMBODIMENTS

1. Hardware Configuration of Display Control Device

Figure 1:
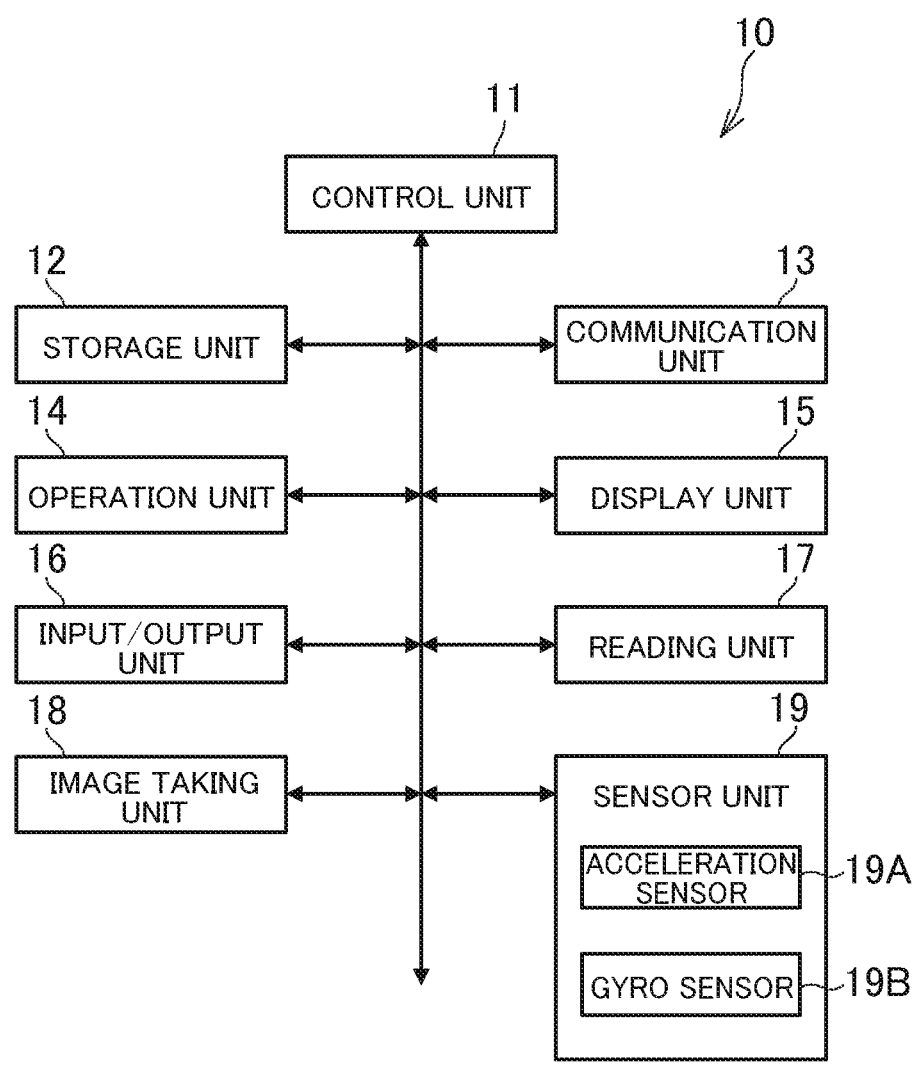
FIG. 1 is a diagram for illustrating a hardware configuration of a display control device.

Now, a description is given of a display control device according to an exemplary embodiment of the present invention. A display control device 10 is a computer configured to provide augmented reality to a user, and is a cell phone (including a smart phone), a personal digital assistant (including a tablet computer), a personal computer, or a server computer, for example. FIG. 1 is a diagram for illustrating a hardware configuration of the display control device. As illustrated in FIG. 1, the display control device 10 includes a control unit 11, a storage unit 12, a communication unit 13, an operation unit 14, a display unit 15, an input/output unit 16, a reading unit 17, an image taking unit 18, and a sensor unit 19.

The control unit 11 includes, for example, at least one microprocessor. The control unit 11 executes processing in accordance with programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a hard disk drive or a flash memory. The communication unit 13 is a communication interface for wired communication or wireless communication, and performs data communication via the network. The operation unit 14 is an input device to be operated by a user, and includes, for example, a pointing device such as a touch panel and a mouse, or a keyboard. The operation unit 14 transmits details of operation by the user to the control unit 11. The display unit 15 is, for example, a liquid crystal display unit or an organic EL display unit. The display unit 15 displays a screen in accordance with an instruction of the control unit 11. The input/output unit 16 is an input/output interface, and includes a USB port, for example. The input/output unit 16 is used to perform data communication to/from an external device. The reading unit 17 reads a computer-readable information storage medium, and includes an optical disc drive or a memory card slot, for example.

The image taking unit 18 includes at least one camera configured to take a still image or a moving image, and includes a CMOS image sensor, a CCD image sensor, or other image sensors, for example. For example, the image taking unit 18 is capable of consecutively taking images of a real space at a predetermined frame rate. The sensor unit 19 includes various sensors configured to detect a position, a posture, and the like of the display control device 10, and includes an acceleration sensor 19A and a gyro sensor 19B, for example. The acceleration sensor 19A is also called "motion sensor", and detects an acceleration of the display control device 10. As a detection method of the acceleration sensor 19A, a vibration method, an optical method, a semi-conductor method, or other various methods can be applied. The gyro sensor 19B is also called "gyroscope", and detects an angular velocity of the display control device 10. As a detection method of the gyro sensor 19B, a mechanical method, a fluidic method, an optical method, a quantum method, or other various methods can be applied.

Programs and data, which are described to be stored in the storage unit 12, may be supplied from another computer via a network, or maybe supplied from a computer-readable information storage medium (for example, USB memory, SD card, or optical disc) via the input/output unit 16 or the reading unit 17. Moreover, the display unit 15 and the image taking unit 18 may be, instead of being incorporated in the display control device 10, outside the display control device 10 and connected thereto via the input/output unit 16. Further, the hardware configuration of the display control device 10 is not limited to the above-mentioned example, and various kinds of hardware can be applied.

2. Outline of Processing to be Executed by Display Control Device

The display control device 10 combines a taken image taken of the real space by the image taking unit 18, and a virtual image showing a virtual three-dimensional object with each other to provide augmented reality to the user. In this embodiment, a description is given as an example of a case in which inside of a room is the real space, virtual furniture to be arranged in the room is the virtual three-dimensional object, and an image showing a view of the virtual furniture as seen from a virtual viewpoint is the virtual image. In other words, a description is given of a case of providing augmented reality in which furniture that does not exist in reality appears to exist.

Figure 2:
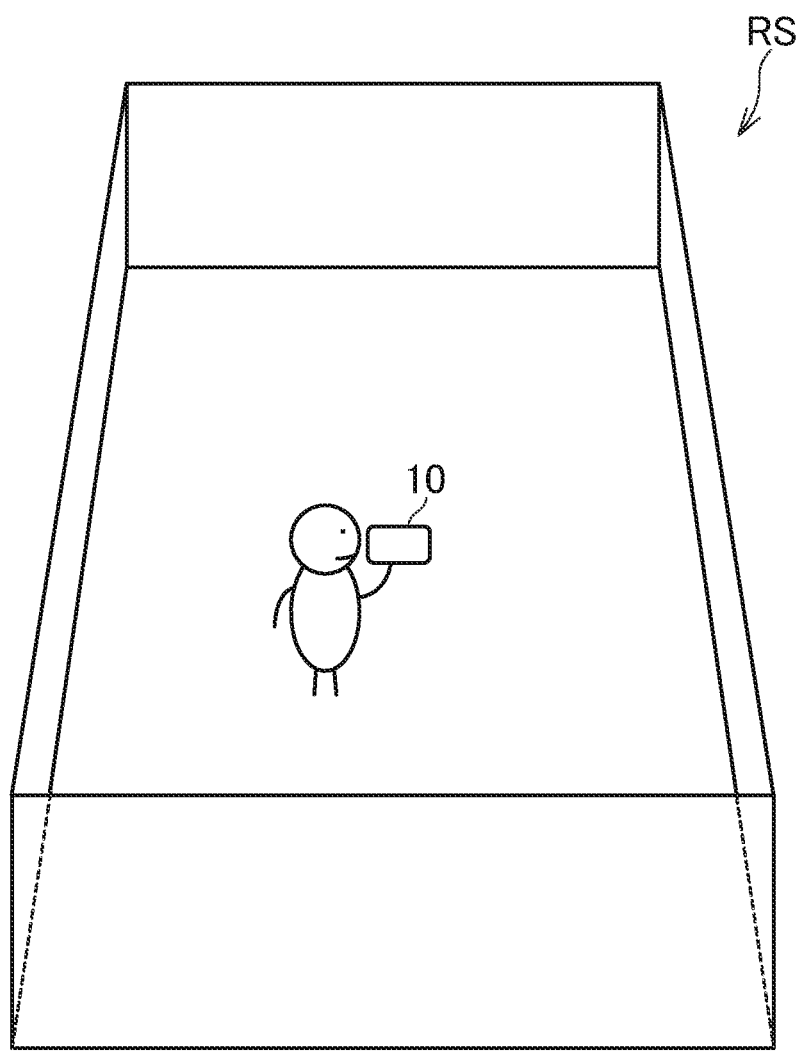
FIG. 2 is a diagram for illustrating how an image taking unit takes an image of a real space.

FIG. 2 is a diagram for illustrating how the image taking unit 18 takes an image of the real space. As illustrated in FIG. 2, a real space RS is inside of a room, and the user holds the display control device 10 to take an image of any location in the real space RS. In the real space RS, furniture or household electric appliances may be arranged, but for the sake of simplicity of the description, the furniture or the household electric appliances are not arranged in this example.

For example, the user can move the display control device 10 to change at least one of a position and an orientation of the image taking unit 18. The orientation of the image taking unit 18 means the same as an image taking direction (line-of-sight direction) or a point of gaze of the image taking unit 18. For example, when the image taking unit 18 is changed in posture or is rotated, the orientation of the image taking unit 18 is changed. The position and the orientation of the image taking unit 18 are not always required to be changed both at the same time, and it is only required that at least one of the position and the orientation be variable. When at least one of the position and the orientation of the image taking unit 18 is changed, a photographic range (field of view) of the image taking unit 18 is changed.

The image taking unit 18 consecutively takes images of the real space RS at the predetermined frame rate. A frame rate is the number of times of processing per unit time, and is the number of still images (frames) per unit time in a case of a moving image. The frame rate may be a fixed value, or may be specified by the user. For example, when the frame rate is N fps (N: natural number, fps: frames per second), a length of each frame is 1/N second, and the image taking unit 18 takes an image of the real space RS for each frame, which is a unit of processing, to generate taken images.

It is not particularly required that the taken images be displayed in real time, and still image data or moving image data of individual taken images may be stored in the storage unit 12. However, in this embodiment, a description is given of a case in which the taken images are displayed in real time. In other words, in this embodiment, processing of acquiring the taken images, and processing of displaying the taken images are executed for each frame, and the taken images are displayed immediately after being taken.

Figure 3:
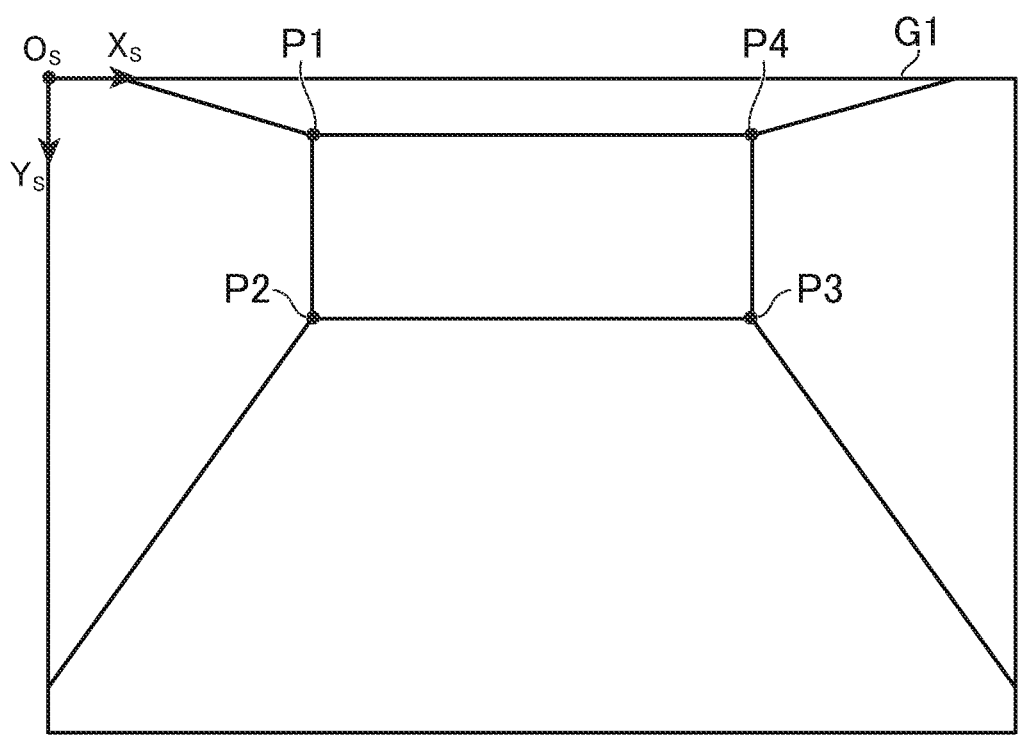
FIG. 3 is a diagram for illustrating an example of a taken image.

FIG. 3 is a diagram for illustrating an example of the taken image. As described above, the furniture, the household electric appliances, and the like are not arranged in the real space RS, and a taken image G1 is taken only of the walls, floor, and ceiling as illustrated in FIG. 3. In this embodiment, the upper left of the taken image G1 is set as an origin Os, and screen coordinate axes (Xs axis and Ys axis) are set. Moreover, P1 to P4 illustrated in FIG. 3 are feature points extracted from the taken image G1. Details of the feature points are described later.

When the augmented reality is provided, the virtual image may be combined with the taken image G1 at any timing. For example, the virtual image may be combined immediately after the taken image G1 is displayed, the virtual image may be combined after the elapse of several seconds, or the virtual image may be combined when the user performs a predetermined operation.

The virtual three-dimensional object to appear in the virtual image is a three-dimensional model formed of at least one polygon. The virtual three-dimensional object is arranged in a virtual space built in the storage unit 12. A position and an orientation of the virtual three-dimensional object in the virtual space may be determined in advance, or may be specified by the user. Moreover, the type of the virtual three-dimensional object to be combined may be determined in advance, but may be freely selected by the user for combination from among a plurality of types of virtual three-dimensional objects.

For example, under a state in which the taken image G1 is displayed, the user may select a virtual three-dimensional object for combination, and then specify a suitable position on a screen to specify the position of the virtual three-dimensional object. Moreover, for example, the user may move, or change the orientation of, the virtual three-dimensional object. Alternatively, the user may specify a size of the virtual three-dimensional object, for example. Further, the user may specify a color or texture of the virtual three-dimensional object.

Figure 4:
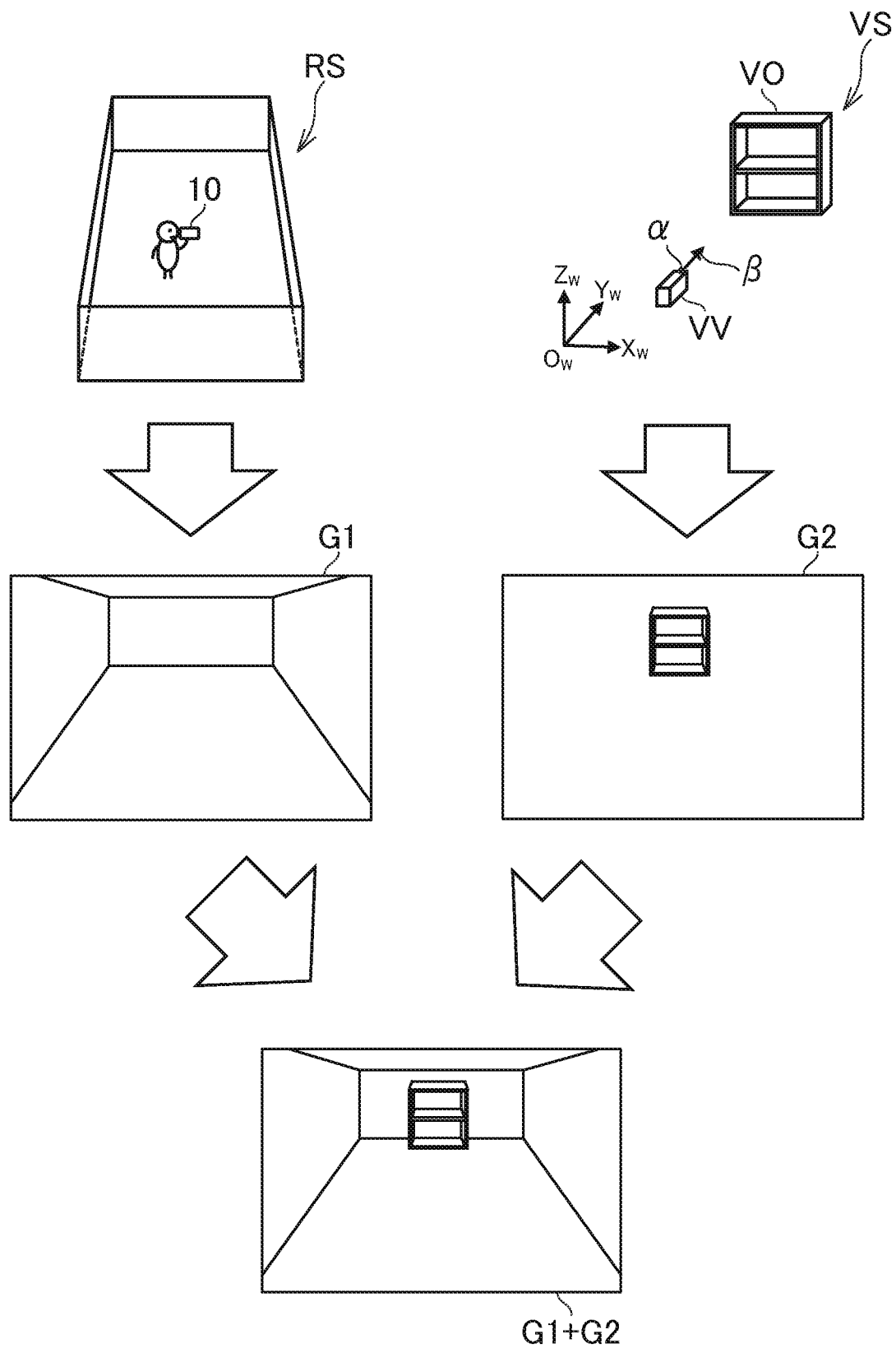
FIG. 4 is an explanatory diagram of processing of combining a virtual image with the taken image.

FIG. 4 is an explanatory diagram of processing of combining the virtual image with the taken image G1. As illustrated in FIG. 4, when the augmented reality is to be provided, a virtual space VS, which is a virtual three-dimensional space, is built in the storage unit 12. In the virtual space VS, three coordinate axes (Xw axis, Yw axis, and Zw axis), which are orthogonal to one another, are set. Those three coordinate axes are coordinate axes of a world coordinate system. An origin Ow may be any position, and its position in the virtual space VS is expressed by three-dimensional coordinates.

In the virtual space VS, a virtual three-dimensional object VO is arranged, and a virtual viewpoint VV is set. The virtual viewpoint VV is also called "virtual camera", and defines coordinate axes of a view coordinate system. In FIG. 4, a position of the virtual viewpoint VV is indicated by a reference symbol "α", and an orientation of the virtual viewpoint VV is indicated by a reference symbol "β". A virtual image G2 shows a view of the virtual three-dimensional object VO as seen from the virtual viewpoint VV. For example, the virtual image G2 is generated by three-dimensional coordinates of each vertex of the virtual three-dimensional object VO being transformed to two-dimensional coordinates of a screen coordinate system. To this transformation processing itself, known geometry processing can be applied.

As illustrated n FIG. 4, the virtual image G2 is combined with the taken image G1 to provide augmented reality in which the virtual three-dimensional object VO, which does not exist in reality, appears to be arranged in the real space RS. In the example of FIG. 4, there is displayed a screen in which the virtual three-dimensional object VO appears to be arranged before the wall at the back as seen from the image taking unit 18.

In order to increase a sense of reality of the augmented reality, when the user moves the image taking unit 18, it is required to adjust the appearance of the virtual three-dimensional object VO to correspond to the change in appearance of a subject. In regard to this point, when the processing of estimating the position and the orientation of the image taking unit 18 with the use of SLAM, for example, to control the virtual viewpoint VV is executed for each frame in order to adjust the appearance of the virtual three-dimensional object VO as described above, this processing is complicated, and hence a processing load on the display control device 10 becomes higher.

To address this problem, in this embodiment, instead of executing the complicated processing for each frame, simple processing of processing the virtual image G2 is interposed between frames to thin out frames of complicated processing, to thereby reduce the processing load on the display control device 10 while maintaining the sense of reality of the augmented reality. Now, a detailed description is given of the display control device 10 while referring to frames on which the complicated processing is to be executed as "first display control frames", and referring to frames on which the simple processing is to be executed as "second display control frames".

3. Functions to be Implemented in Display Control Device

Figure 5:
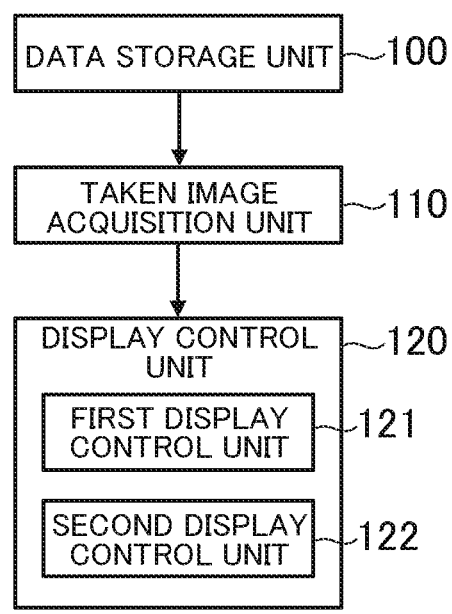
FIG. 5 is a functional block diagram for illustrating an example of functions to be implemented in the display control device.

FIG. 5 is a functional block diagram for illustrating an example of functions to be implemented in the display control device 10. As illustrated in FIG. 5, in this embodiment, a description is given of a case in which a data storage unit 100, a taken image acquisition unit 110, and a display control unit 120 are implemented in the display control device 10.

3-1. Data Storage Unit

The data storage unit 100 is implemented mainly by the storage unit 12. The data storage unit 100 stores data required to provide the augmented reality. The data storage unit 100 stores object data defining a shape of the virtual three-dimensional object VO, for example. In the object data, a positional relationship of vertices of the virtual three-dimensional object VO is stored. Moreover, when a color or texture is set to the virtual three-dimensional object VO, the data storage unit 100 may store data indicating the color or texture, for example.

Further, the data storage unit 100 stores virtual space data indicating a current state of the virtual space VS, for example. As the current state of the virtual space VS, a representative position, an orientation (front direction), and positions of vertices of a polygon of the virtual three-dimensional object VO may be stored, or virtual viewpoint parameters regarding the virtual viewpoint VV may be stored, for example. As the virtual viewpoint parameters, a position, an orientation, and an angle of view of the virtual viewpoint VV may be stored, for example. The orientation of the virtual viewpoint VV may be expressed by three-dimensional coordinates of the point of gaze, or by vector information indicating the line-of-sight direction. In addition, the virtual viewpoint parameters may include information defining a near clipping plane or far clipping plane indicating a boundary of a rendering area, for example.

The data to be stored in the data storage unit 100 is not limited to the example described above. For example, when the taken images G1 are not particularly displayed in real time, the data storage unit 100 may store the still image data indicating individual taken images or the moving image data indicating a moving image. The data storage unit 100 may also store data indicating a repeated pattern of the frames, for example.

3-2. Taken Image Acquisition Unit

The taken image acquisition unit 110 is implemented mainly by the control unit 11. The taken image acquisition unit 110 acquires the taken images taken at the predetermined frame rate by the image taking unit 18, which is movable in the real space RS. As described above, in this embodiment, the real space RS is the inside of the room, and hence the taken images G1 are taken of a view of the inside of the room.

The image taking unit 18 being movable in the real space RS means that a position and an orientation of the image taking unit 18 can be changed, and that a casing including the image taking unit 18 can be moved, a posture of the casing can be changed, or the casing can be rotated, for example. In other words, the image taking unit 18 being movable in the real space RS means that the photographic range (field of view) of the image taking unit 18 can be changed. It is not always required that the image taking unit 18 be moved at all times, and may stay temporarily at the current location so that the position and the orientation are not changed.

The taken image acquisition unit 110 consecutively acquires the taken images G1 generated by the image taking unit 18. In this embodiment, the taken image acquisition unit 110 acquires in real time the taken images taken by the image taking unit 18. In other words, the taken image acquisition unit 110 acquires a taken image G1 immediately after the image taking unit 18 generates the taken image G1. The taken image acquisition unit 110 acquires the taken image G1 within predetermined time from a time point at which the image taking unit 18 generates the taken image G1.

When the taken images G1 are not particularly displayed in real time, the taken image acquisition unit 110 may acquire the still image data or moving image data stored in the data storage unit 100. Moreover, when the still image data or the moving image data is stored in a computer or information storage medium other than the display control device 10, the taken image acquisition unit 110 may acquire the still image data or the moving image data from the computer or information storage medium.

3-3. Display Control Unit

The display control unit 120 is implemented mainly by the control unit 11. The display control unit 120 combines the taken image G1 and the virtual image G2 with each other to be displayed on the display unit 15. For example, the display control unit 120 superimposes the virtual image G2 on the taken image G1 to be displayed. In this case, the display control unit 120 sets a layer of the virtual image G2 above (before or in front of) a layer of the taken image G1. Moreover, for example, the display control unit 120 may alpha-blend the taken image G1 and the virtual image G2 with each other to generate a combined image. The alpha blending is image combination processing in which a transparency is set to each of a plurality of images, a pixel value of each image is multiplied by the transparency, and the multiplied pixel values are added to each other to generate one image.

The display control unit 120 includes a first display control unit 121 and a second display control unit 122. The first display control unit 121 executes the processing when the current frame is a first display control frame, and the second display control unit 122 executes the processing when the current frame is a second display control frame.

The first display control frame may come only once, but in this embodiment, the first display control frames, which are frames on which the first display control unit 121 performs display control, repeatedly come a plurality of times, and at least one second display control frame, which is a frame on which the second display control unit 122 performs display control, is set after each of the first display control frames. The first display control frames may come irregularly, but come regularly (periodically) in this example. A repeated pattern of the first display control frames and the second display control frames is determined in advance, and the display control unit 120 determines whether the current frame is a first display control frame or a second display control frame based on the repeated pattern.

Figure 6:
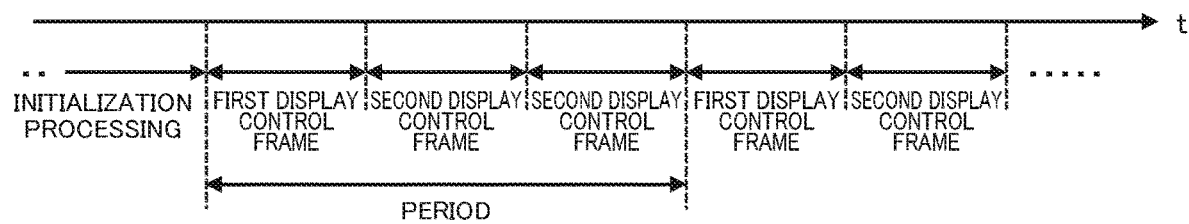
FIG. 6 is a chart for showing an example of a repeated pattern of first display control frames and second di splay control frames.

FIG. 6 is a chart for showing an example of the repeated pattern of the first display control frames and the second display control frames. The t axis shown in FIG. 6 is a time axis. Between one first display control frame and the next first display control frame, k second display control frames (k: natural number) are set, and in the example of FIG. 6, k is 2. When a combination (unit of repetition of frames) of a first display control frame and subsequent k second display control frames is described as a "period", in the example of FIG. 6, one period is formed of k+1 frames.

For example, a counter variable indicating a place of the current frame as counted from a predetermined time point is prepared in advance, and the display control unit 120 determines whether the current frame is a first display control frame or a second display control frame based on the counter variable. When the counter variable is represented by i, for example, and when initialization processing to be described later is ended, the display control unit 120 sets an initial value (for example, i=1) as the counter variable i. The display control unit 120 counts up the counter variable i with the elapse of a frame (that is, every 1/N second). Then, when the remainder of the counter variable i divided by the total number of frames (in this example, 3) per period is a predetermined value (in this example, 1), the display control unit 120 determines that the current frame is a first display control frame, and that the current frame is a second display control frame otherwise.

Lengths of time of the first display control frame and the second display control frame may be different from each other, but are the same in this embodiment. In other words, when the frame rate is N fps, the length of the first display control frame and the length of the second display control frame are both 1/N second in this embodiment. Moreover, a plurality of first display control frames may be included in one period. For example, in one period, after the first display control frame comes twice in succession, k second display control frames may come. Further, for example, in one period, after the first display control frame comes for the first time and $k_1$ second display control frames come, the first display control frame may come for the second time and $k_2$ second display control frames may come. In this manner, the numbers and order of first display control frames and second display control frames included in one period may be suitably selected.

3-3-1. First Display Control Unit

The first display control unit 121 estimates a current position and orientation of the image taking unit 18 based on the taken images G1, and combines the virtual image G2 with a taken image G1 to be displayed, the virtual image G2 showing the view of the virtual three-dimensional object VO as seen from the virtual viewpoint VV based on a result of the estimation. In this embodiment, the first display control unit 121 combines a taken image G1 acquired in real time and the virtual image G2 with each other to be displayed. In other words, the taken image acquisition unit 110 acquires the taken image G1, and immediately after the first display control unit 121 generates the virtual image G2, the taken image G1 and the virtual image G2 are combined with each other to be displayed.

For example, the first display control unit 121 estimates the current position and orientation of the image taking unit 18, and reflects the estimation result on the position and the orientation of the virtual viewpoint VV. As a result, when the image taking unit 18 is moved, the virtual viewpoint VV is also moved similarly to the image taking unit 18. In other words, the position and the orientation of the virtual viewpoint VV are changed in the same manner as the position and the orientation of the image taking unit 18. As the method of estimating the position and the orientation of the image taking unit 18 itself, a known viewpoint estimation method can be applied, and the SLAM may be used, for example.

Figure 7:
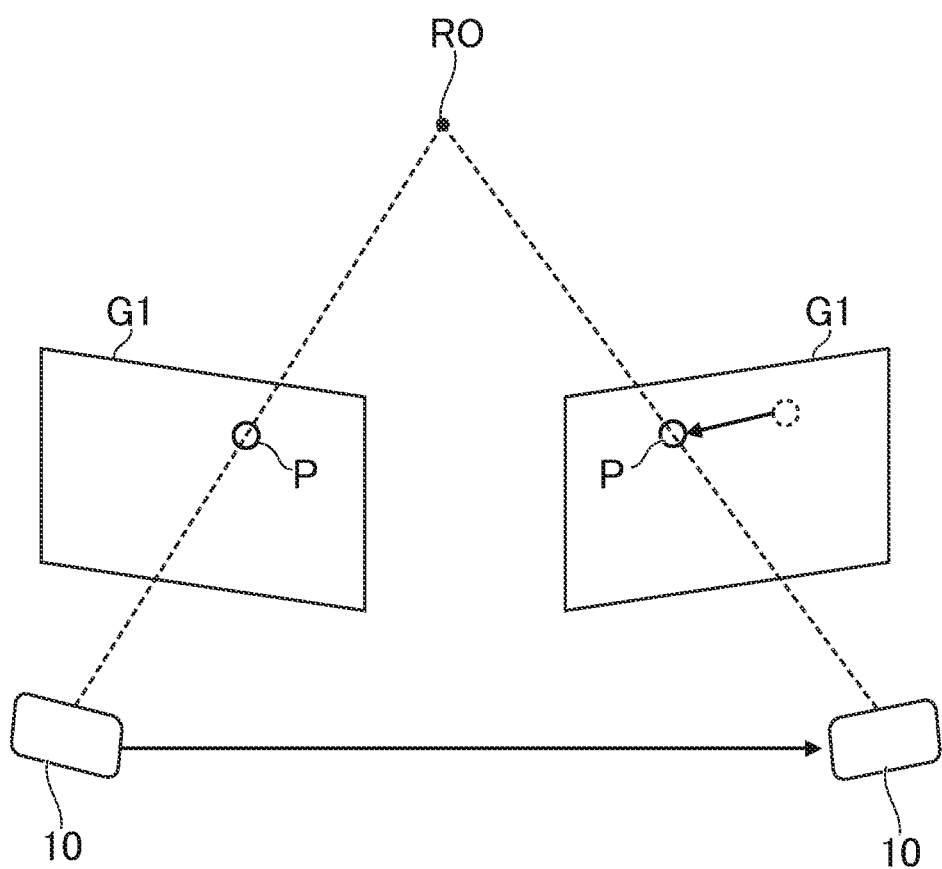
FIG. 7 is a diagram for illustrating an example of a method of estimating a position and an orientation of the image taking unit.

FIG. 7 is a diagram for illustrating an example of the method of estimating the position and the orientation of the image taking unit 18. For example, the first display control unit 121 extracts a feature point P from the taken images G1, and tracks the extracted feature point P. The feature point P is a point indicating a feature of a subject RO of which the taken images G1 are taken, and may be a point indicating a part of the contour of the subject RO, or a point (for example, center point) inside the subject RO, for example. The method of extracting the feature point P itself maybe executed based on a known feature point extraction algorithm, and a point on the contour of the subject RO detected by contour extraction processing may be set as the feature point P, or a point at which contour lines cross at a predetermined angle or more may be set as the feature point P, for example.

For example, the first display control unit 121 acquires, based on changes of a group of feature points of the taken images G1 that are consecutively taken, a group of three-dimensional coordinates (three-dimensional map) corresponding to the group of feature points. The group of three-dimensional coordinates may be acquired with the use of triangulation. For example, as illustrated in FIG. 7, when the image taking unit 18 is moved to the right with respect to the subject RO, the feature point P corresponding to the subject RO inside the taken images G1 is moved to the left in the taken images G1. The first display control unit 121 tracks the group of feature points in this manner, and estimates the movement of the image taking unit 18 with the use of the principle of triangulation.

The first display control unit 121 may estimate the current position and orientation of the image taking unit 18 further based on at least one of a detection result of the acceleration sensor 19A, which is capable of detecting a change in position of the image taking unit 18, and a detection result of the gyro sensor 19B, which is capable of detecting a change in orientation of the image taking unit 18. A movement direction and a movement distance maybe acquired by integrating the acceleration detected by the acceleration sensor 19A twice. Moreover, for example, the change in orientation may be acquired by integrating the angular velocity detected by the gyro sensor 19B. For example, the first display control unit 121 may estimate an absolute amount of movement of the image taking unit 18 more accurately based on information obtained by tracking the feature point P, and the information obtained by the sensor unit 19.

After estimating the current position and orientation of the image taking unit 18 as described above, the first display control unit 121 reflects a result of the estimation on the virtual viewpoint parameters of the virtual viewpoint VV. For example, the first display control unit 121 may reflect the estimation result of the current position and orientation of the image taking unit 18 on the virtual viewpoint parameters at the time of the initialization processing and at the time when the first display control frame comes thereafter. For example, the first display control unit 121 may calculate the latest position and orientation of the virtual viewpoint VV in the first display control frame based on a correspondence between the group of feature points and the group of three-dimensional coordinates (that is, pattern in which three-dimensional data projection and new two-dimensional data are compared with each other), or may acquire the latest position and orientation of the virtual viewpoint VV in the first display control frame by processing similar to the processing at the time of the initialization processing (that is, pattern in which the initialization processing is performed every time). When a feature point is newly obtained from a taken images G1, processing similar to the processing at the time of the initialization processing may be performed.

After determining the virtual viewpoint parameters of the virtual viewpoint VV, the first display control unit 121 generates the virtual image G2 based on predetermined geometry processing, and combines the generated virtual image G2 with the taken image G1 to be displayed, the virtual image G2 showing the view of the virtual three-dimensional object VO as seen from the virtual viewpoint VV.

3-3-2. Second Display Control Unit

The second display control unit 122 processes, in a frame subsequent to a frame on which the first display control unit 121 has performed the display control, the virtual image G2 based on movement information on a movement of the image taking unit 18, and combines the processed virtual image G2 with the taken image G1 to be displayed. In this embodiment, the second display control unit 122 combines the taken image G1 acquired in real time and the processed virtual image G2 with each other to be displayed.

Processing of an image is two-dimensional processing, and may be changing a size (magnification) of the image, rotating the image, deforming the image, trimming a part of the image, or a combination thereof, for example. The deformation of the image is changing a rectangular or square image into another shape, and a projective transformation, or an affine transformation in which a linear transformation and a parallel translation are combined, may be used, for example. For example, with the projective transformation, the rectangular or square image is transformed into a trapezoid, and with the affine transformation, the rectangular or square image is transformed into a parallelogram.

The movement information is information on changes in position and orientation of the image taking unit 18 from the predetermined time point, and is information directly or indirectly indicating the movement of the image taking unit 18. The word "directly" means to indicate the changes in position and orientation of the image taking unit 18 themselves, and is expressed in a three-dimensional amount of change, for example. The word "indirectly" means that there is a correlation between the movement of the image taking unit 18 and the value of the movement information, and that, when at least one of the position and the orientation of the image taking unit 18 is changed, the value of the movement information is changed, for example.

In this embodiment, the first display control frames repeatedly come a plurality of times, and hence the second display control unit 122 may process the virtual image G2 generated based on the latest one of the first display control frames, which repeatedly come a plurality of times, based on the movement information on a movement of the image taking unit 18 from the latest one of the first display control frames. In other words, the virtual image G2 to be processed by the second display control unit 122 is the latest one of the virtual images G2 that have been generated in the past, and may be regarded as the virtual image G2 that is being displayed on the display unit 15, for example. The second display control unit 122 may process a virtual image G2 that is generated prior to the latest one of the first display control frames.

Moreover, in this embodiment, the movement information is information indirectly indicating the movement of the image taking unit 18, and information indicating changes of the feature points of the taken images G1 is described as an example of the movement information. In other words, the movement information in this embodiment is information obtained by tracking the two-dimensional movement of the feature points. For example, the movement information includes vector information indicating changes of two-dimensional coordinates of each of the feature points P1 to P4 in the taken images G1. The second display control unit 122 acquires the movement information based on the changes of the feature points in the taken images G1. The method of extracting the feature points itself may be the same as that used by the first display control unit 121.

A relationship between the movement information and a processing method may be stored in a form of a mathematical expression or a tabular form in the data storage unit 100, or may be described as a part of program code. In this relationship, the processing method is defined so that a change in shape of the subject in the taken images G1 and a change in shape of the virtual three-dimensional object VO in the virtual images G2 resemble each other. Stated differently, in this relationship, the processing method is defined so that a change in size and a degree of deformation of the subject in the taken images G1 and a change in size and a degree of deformation of the virtual three-dimensional object VO in the virtual images G2 resemble each other. The second display control unit 122 processes the virtual image G2 by the processing method associated with the movement information.

Figure 8:
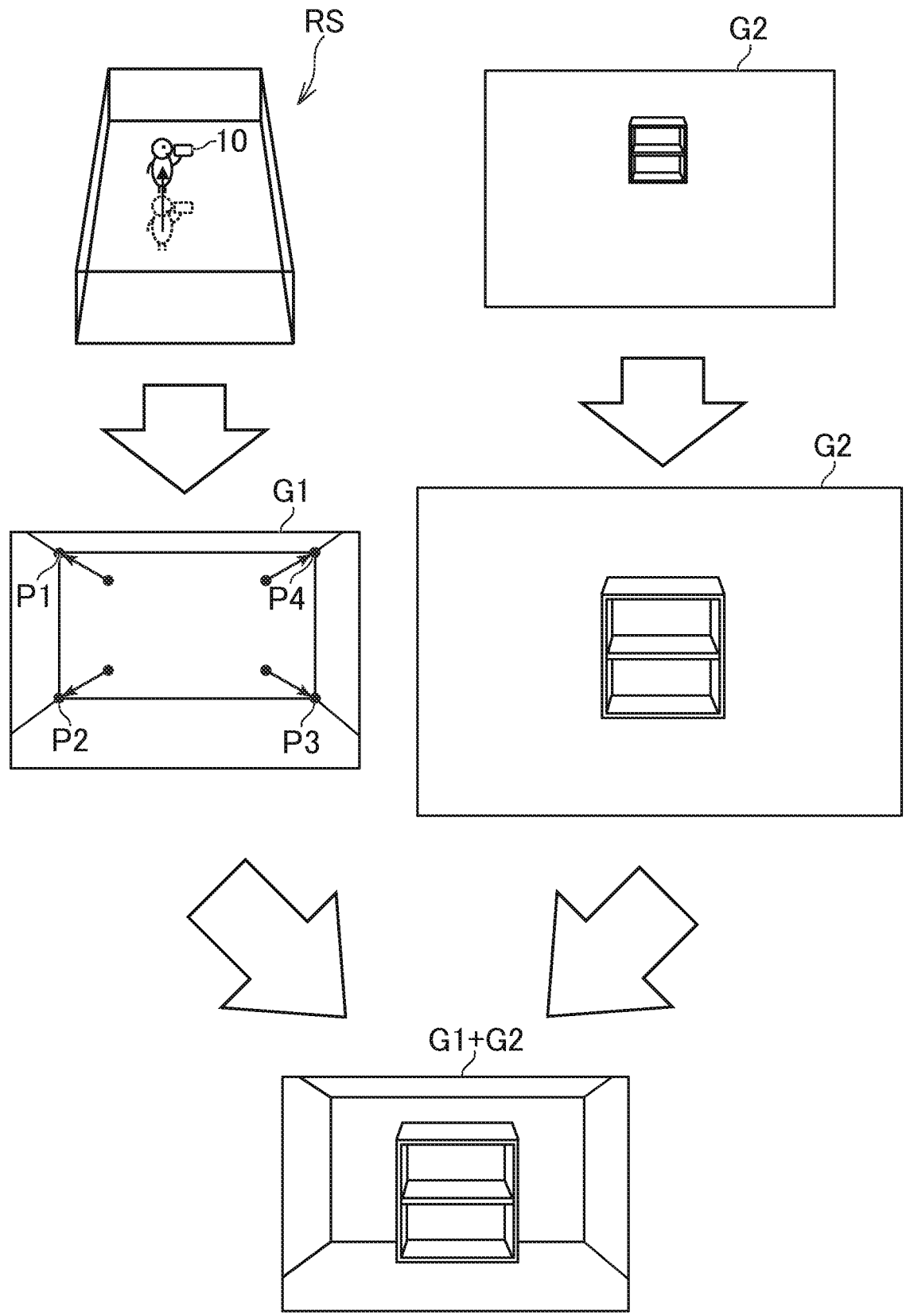
FIG. 8 is a diagram for illustrating an example of a relationship between movement information and a processing method.

FIG. 8 to FIG. 12 are diagrams for illustrating examples of the relationship between the movement information and the processing method. For example, as illustrated in FIG. 8, when the user moves forward while holding the display control device 10, the subject of which images have been taken appears larger in the taken image G1. Therefore, intervals among the feature points P1 to P4 are increased, and vector information of the feature points, which is indicated by the movement information, is directed outward. In this case, the second display control unit 122 estimates that the image taking unit 18 has moved forward, and increases the magnification to enlarge the virtual image G2 as illustrated in FIG. 8. The magnification may be set higher as the vector information directed outward becomes larger. As a result, the virtual three-dimensional object VO shown in the virtual image G2 also appears larger, and hence augmented reality that appears to move forward to approach the virtual three-dimensional object VO can be provided by the simple processing.

Figure 9:
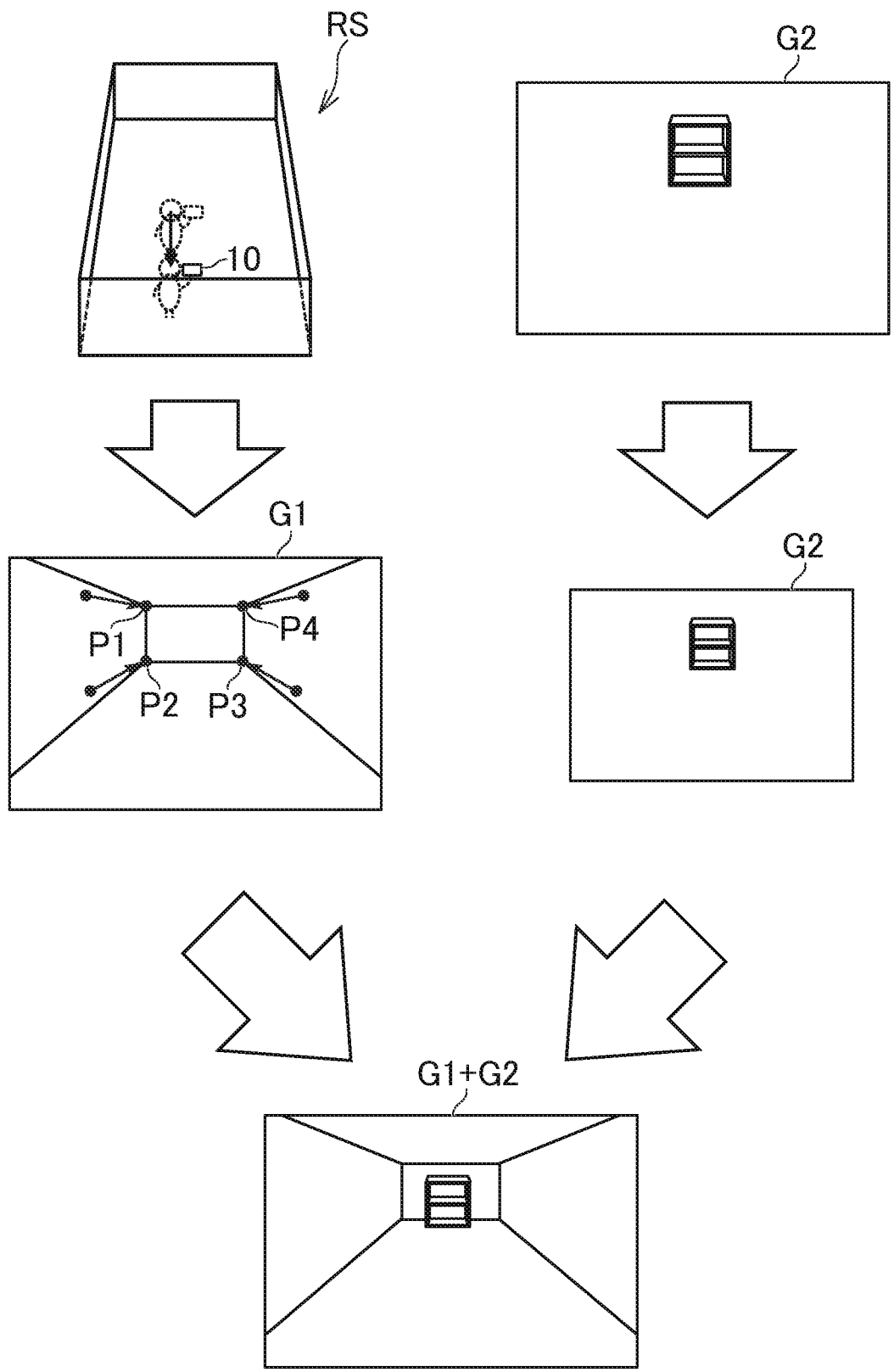
FIG. 9 is a diagram for illustrating another example of the relationship between the movement information and the processing method.

Moreover, for example, as illustrated in FIG. 9, when the user backs up while holding the display control device 10, the subject of which images have been taken appears smaller in the taken image G1. Therefore, intervals among the feature points P1 to P4 are reduced, and vector information of the feature points, which is indicated by the movement information, is directed inward. In this case, the second display control unit 122 estimates that the image taking unit 18 has backed up, and reduces the magnification to reduce the virtual image G2 as illustrated in FIG. 9. The magnification may be set lower as the vector information directed inward becomes larger. As a result, the virtual three-dimensional object VO shown in the virtual image G2 also appears smaller, and hence augmented reality that appears to back up away from the virtual three-dimensional object VO can be provided by the simple processing.

Figure 10:
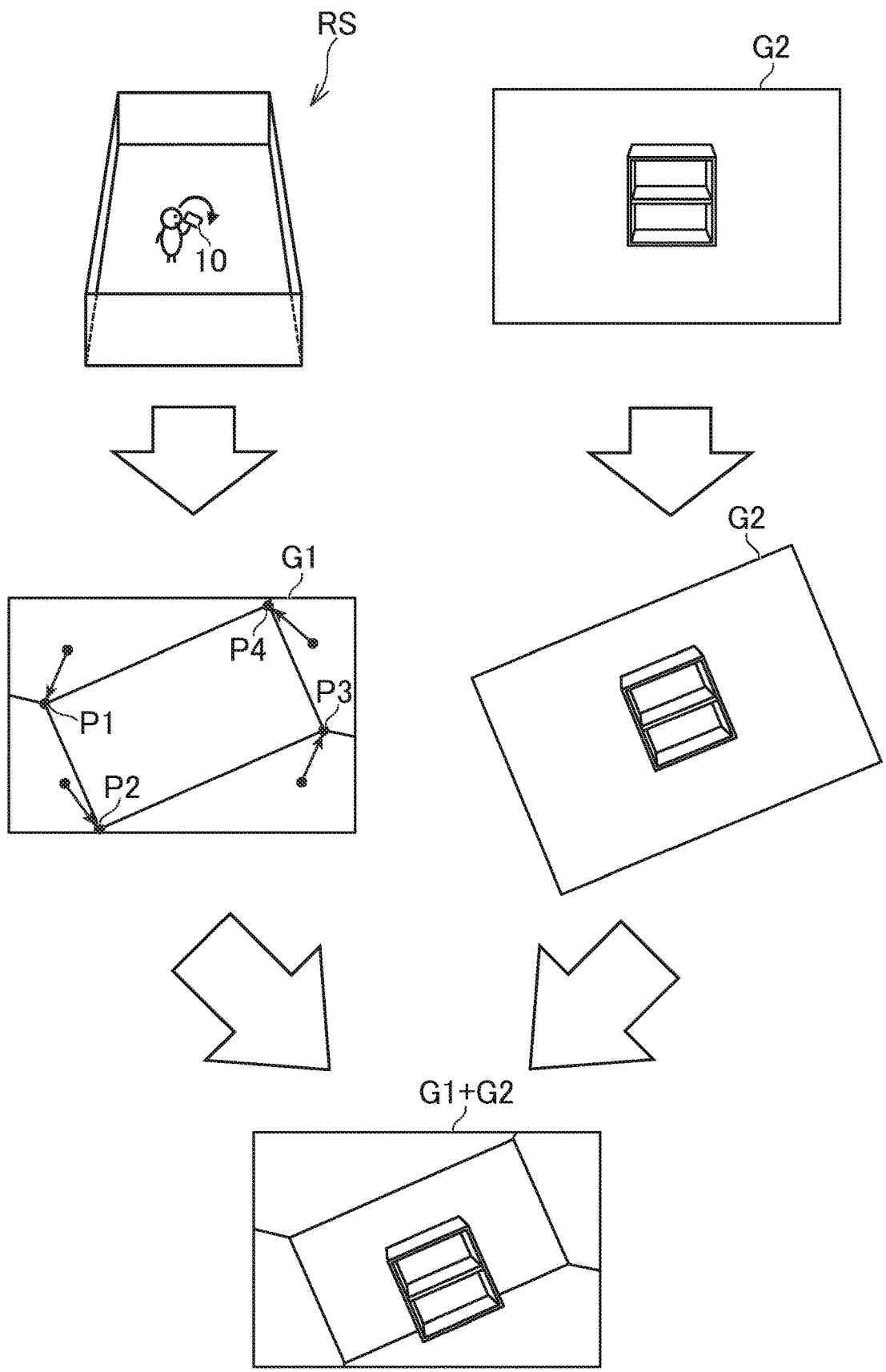
FIG. 10 is a diagram for illustrating still another example of the relationship between the movement information and the processing method.

Further, for example, as illustrated in FIG. 10, the user rotates the display control device 10 on the spot, the subject of which images have been taken is rotated in the opposite direction in the taken images G1. Therefore, the feature points P1 to P4 are rotated in the direction opposite to the direction of rotation of the display control device 10, and vector information of the feature points, which is indicated by the movement information, is directed in a certain direction so as to rotate around a particular position. In this case, the second display control unit 122 estimates that the image taking unit 18 has rotated, and rotates the virtual image G2 in the direction of rotation of the feature points P1 to P4 (direction opposite to the direction of rotation of the image taking unit 18) as illustrated in FIG. 10. An amount of rotation may be set larger as an angle of rotation of the feature points (size of the vector information) becomes larger. As a result, the virtual image G2 is also rotated along with the subject in the taken images G1, and hence augmented reality that appears as if the virtual three-dimensional object VO is arranged at a predetermined position in the real space RS can be provided by the simple processing.

Figure 11:
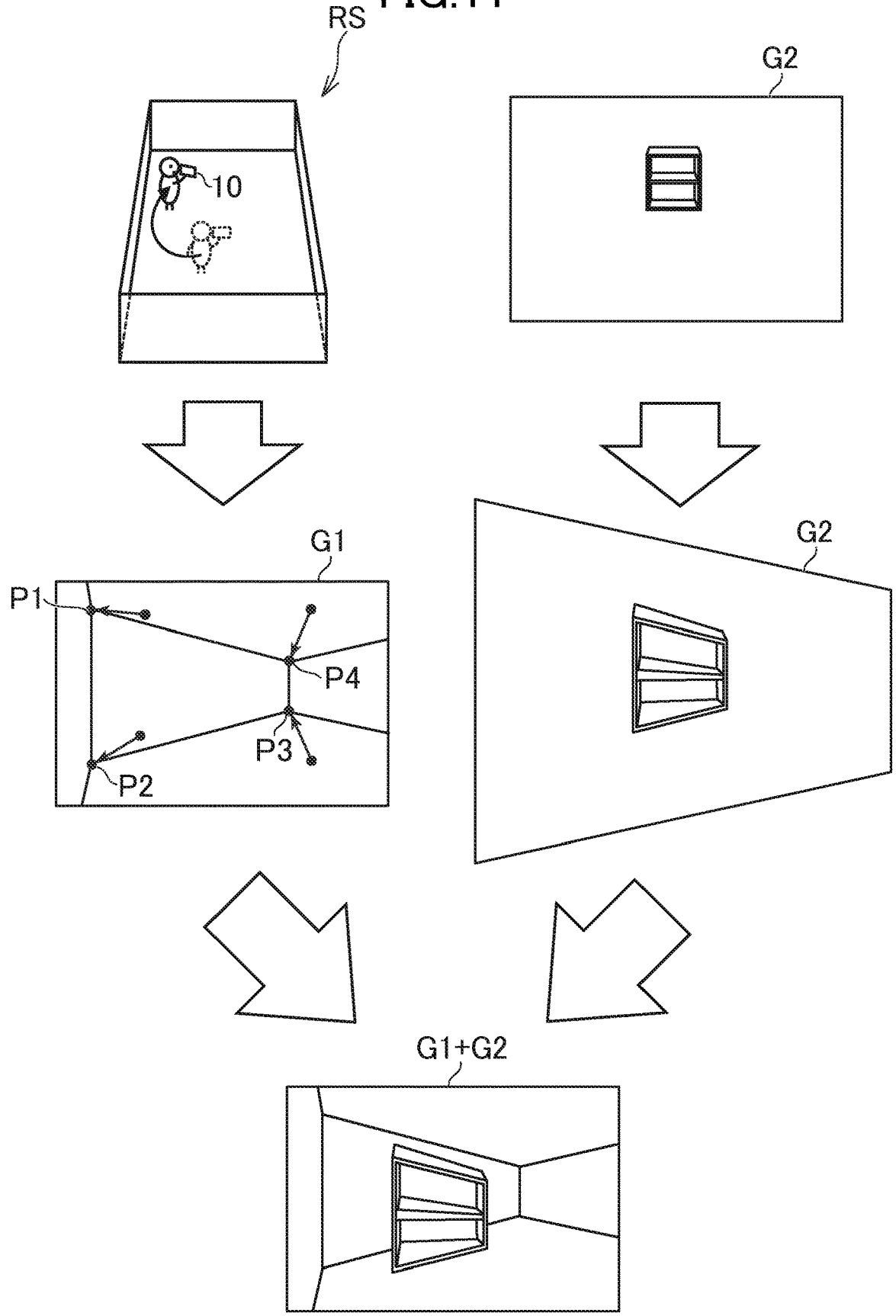
FIG. 11 is a diagram for illustrating yet another example of the relationship between the movement information and the processing method.

Still further, for example, as illustrated in FIG. 11, when the user turns around to approach the subject while holding the display control device 10, the subject of which image have been taken is deformed in the taken image G1. Therefore, each of the feature points P1 to P4 is moved in a direction corresponding to the deformation of the subject, and the vector information of the feature points, which is indicated by the movement information, is directed to the direction corresponding to the deformation of the subject. For example, when the image taking unit 18 is moved diagonally forward left to be directed diagonally right as illustrated in FIG. 11, the wall on the left, which is closer in terms of distance, becomes larger, the wall on the right, which is farther in terms of distance, becomes smaller, and the wall at the front becomes a trapezoid in the taken image G1. Therefore, the feature points P1 to P4 are arranged so as to indicate vertices of the trapezoid.

In the case of FIG. 11, the second display control unit 122 estimates that the image taking unit 18 turns around to approach the subject, and performs a projective transformation on the virtual image G2 so that the virtual image G2 having a rectangular shape is transformed into a trapezoid. A degree of deformation (transformation coefficient) in the projective transformation maybe set larger as a difference between an upper base (for example, line segment connecting the feature points P3 and P4) and a lower base (for example, line segment connecting the feature points P1 and P2) of the trapezoid indicated by the feature points becomes larger. In the example of FIG. 11, the image taking unit 18 is moved forward, and hence, as described with reference to FIG. 8, the magnification of the virtual image G2 may be increased. In contrast, when the image taking unit 18 backs up, the magnification of the virtual image G2 maybe reduced. As a result, the virtual image G2 is also deformed along with the subject of the taken images G1, and hence augmented reality that appears as if the virtual three-dimensional object VO is arranged at a predetermined position in the real space RS can be provided by the simple processing.

Figure 12:
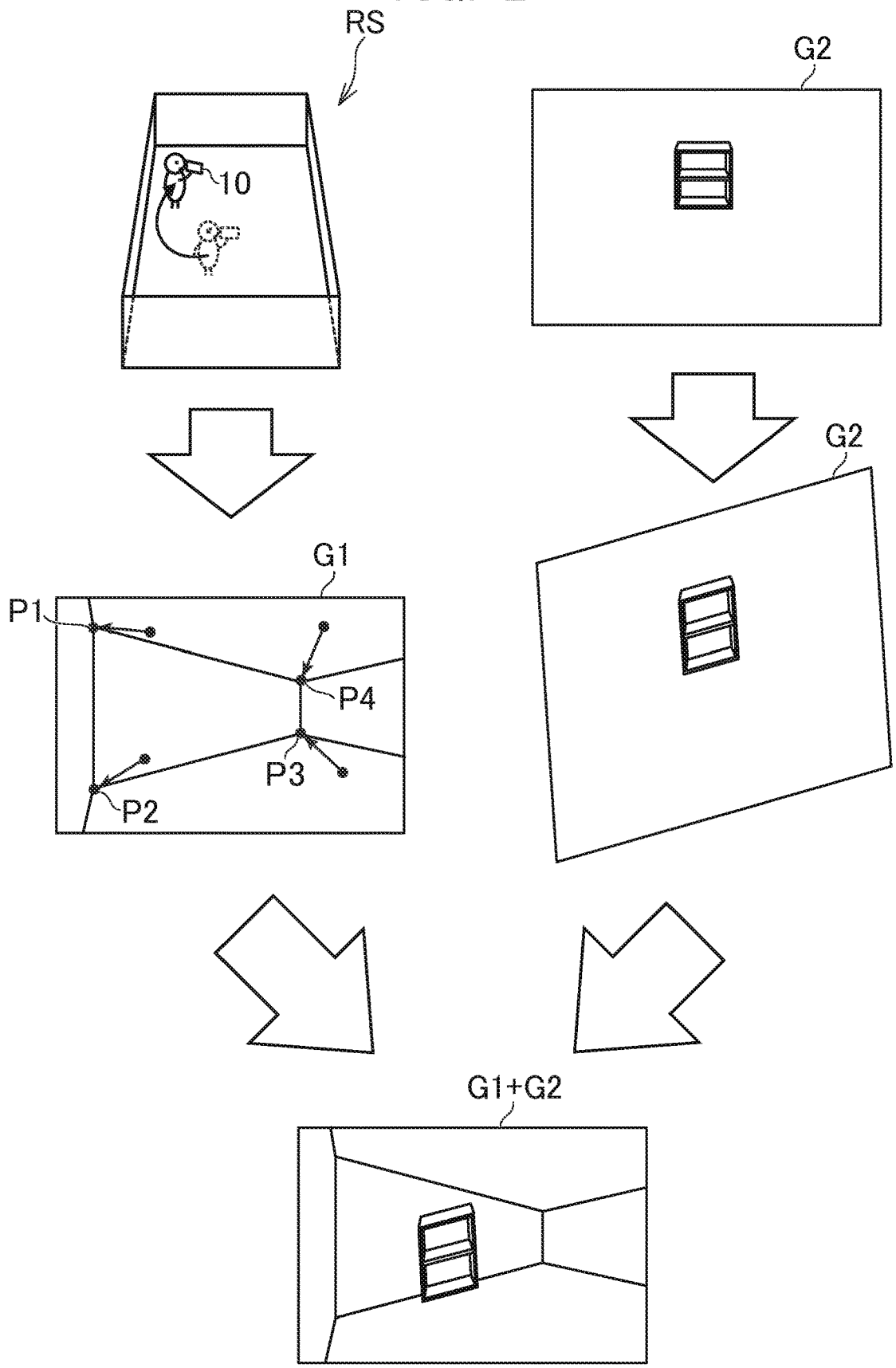
FIG. 12 is a diagram for illustrating yet another example of the relationship between the movement information and the processing method.

When the image taking unit 18 is turned around to approach the subject, the affine transformation may be used instead of the projective transformation. For example, as illustrated in FIG. 12, when the virtual image G2 is subjected to the affine transformation, the virtual image G2 having a rectangular shape is transformed into a parallelogram. As in the projective transformation, a degree of deformation (transformation coefficient) in the affine transformation may be set larger as the difference between the upper base and the lower base of the trapezoid indicated by the feature points becomes larger.

Moreover, as the method of processing the virtual image G2, the methods of FIG. 8 to FIG. 12 may be combined. Further, the method of processing the virtual image G2 is not limited to the examples of FIG. 8 to FIG. 12. The processing method may be any processing method corresponding to a change of the subject in the taken images G1. In other words, the processing method may be any processing method in which the appearance is changed in the same manner as the change in appearance of the subject in the taken images G1. For example, the virtual image G2 may be processed only by the linear transformation without the linear transformation and the parallel translation being combined.

Further, for example, the second display control unit 122 may determine not only the processing method for the virtual image G2 but also a display position of the processed virtual image G2 based on the movement information, and display the processed virtual image at the display position. A relationship between the movement information and the display position may be stored in the data storage unit 100 in a form of a mathematical expression or a tabular form, or may be described as apart of program code. The second display control unit 122 displays the processed virtual image G2 at the display position associated with the movement information.

Figure 13:
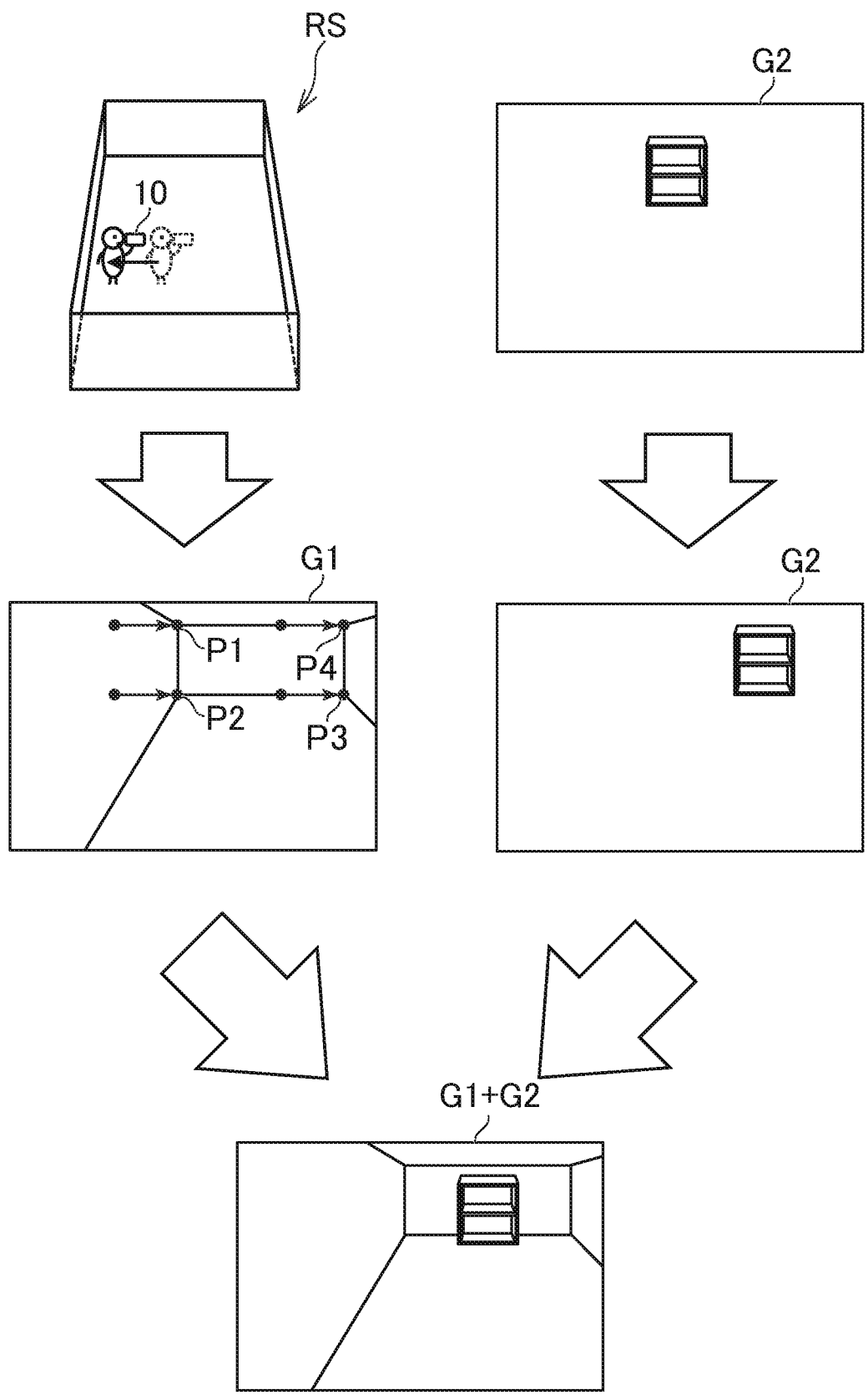
FIG. 13 is a diagram for illustrating an example of a relationship between the movement information and a display position.

FIG. 13 is a diagram for illustrating an example of the relationship between the movement information and the display position. As illustrated in FIG. 13, when the user moves while holding the display control device 10, the subject of which images have been taken is moved in the opposite direction in the taken images G1. Therefore, the feature points P1 to P4 are moved in the same direction as that of the subject. In this case, the second display control unit 122 estimates that the image taking unit 18 has moved, and moves the virtual image G2 in a movement direction of the feature points P1 to P4 (direction opposite to the movement direction of the image taking unit 18) as illustrated in FIG. 13. A movement distance may be set larger as a movement distance (size of the vector information) of the feature points becomes larger. As a result, the user can feel as if the virtual three-dimensional object VO exists at a particular position in the real space RS.

As illustrated in FIG. 13, when the image taking unit 18 is moved to the left, the subject of which the images have been taken is moved to the right in the taken images G1, and hence the feature points P1 to P4 are moved to the right. Therefore, the second display control unit 122 moves the display position of the virtual image G2 to the right when the feature points are moved to the right. As a result, the virtual image G2 can also be moved when the subject of the taken images G1 is moved, and hence augmented reality that appears as if the virtual three-dimensional object VO is arranged at a predetermined position in the real space RS can be provided by the simple processing.

The second display control unit 122 may set the entire taken image G1 as an extraction target for the feature points, but in this embodiment, may set an area corresponding to the display position of the virtual image G2 in the taken image G1 as the extraction target for the feature points. The area corresponding to the display position of the virtual image G2 is pixels in which the virtual three-dimensional object VO is displayed or an area around the pixels of a display area (entire screen) of the display unit 15, and may be an area including the virtual image G2. The area "around" the pixels is an area formed of pixels within a certain distance from the pixels in which the virtual three-dimensional object VO is displayed. For example, in the examples of FIG. 8 to FIG. 13, an area around the pixels in which the virtual image G2 is displayed (for example, area of an image taken of the wall at the front) is set as the extraction target for the feature points.

4. Processing to be Executed in this Embodiment

Figure 14:
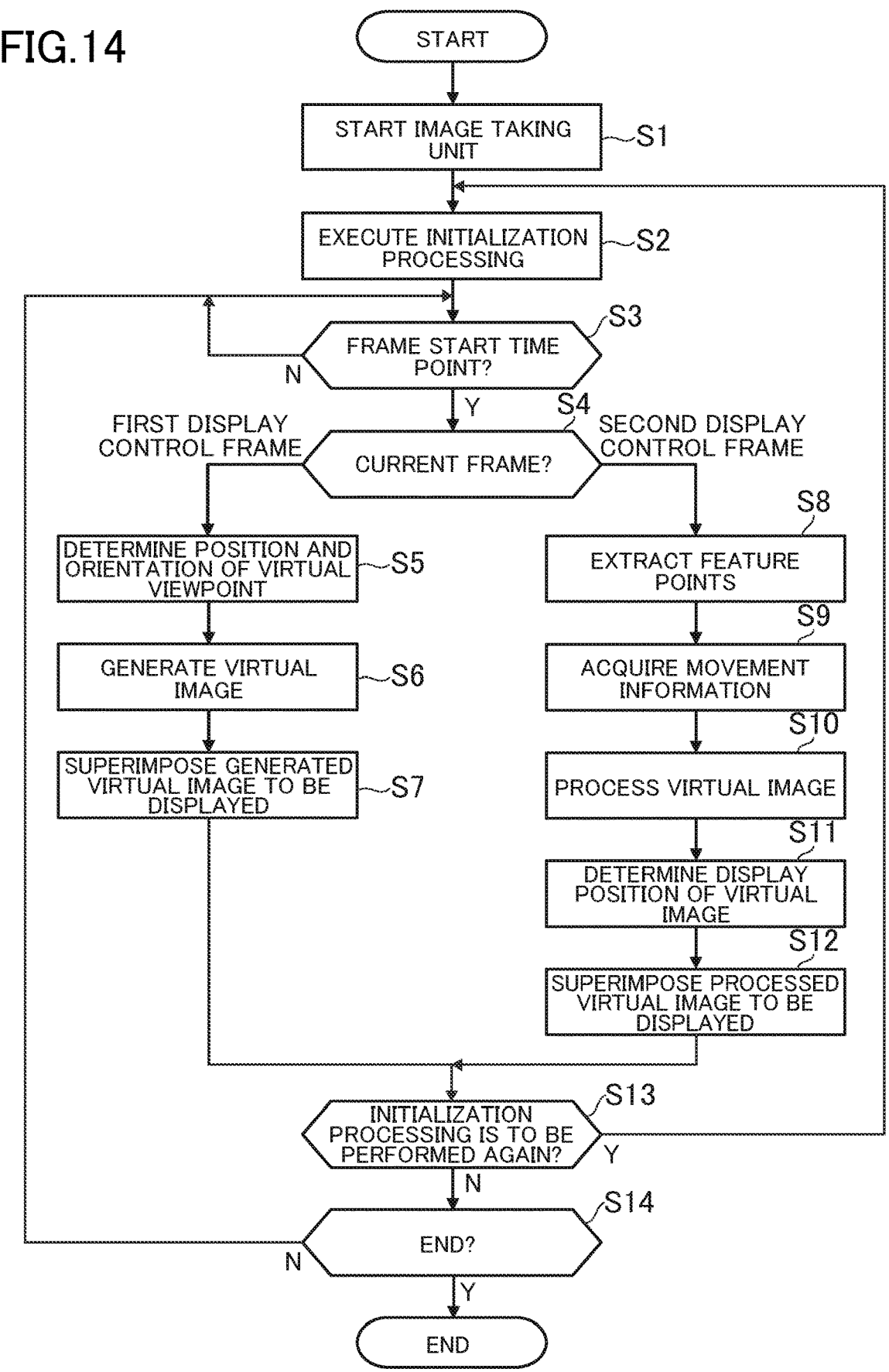
FIG. 14 is a flow chart for illustrating an example of processing to be executed in the display control device.

FIG. 14 is a flow chart for illustrating an example of processing to be executed in the display control device 10. The processing illustrated in FIG. 14 is executed by the control unit 11 operating in accordance with programs stored in the storage unit 12. The processing described below is an example of processing to be executed by the functional blocks illustrated in FIG. 5.

As illustrated in FIG. 14, the control unit 11 first starts the image taking unit 18 (Step S1), and executes the initialization processing (Step S2). The image taking unit 18 started in Step S1 starts taking images based on the predetermined frame rate, and after that, the control unit 11 consecutively displays the taken images G1 on the display unit 15. In Step S2, the control unit 11 estimates the position and the posture of the image taking unit 18 with the use of the SLAM, and acquires initial values of the position and the orientation of the virtual viewpoint VV. The control unit 11 also creates a group of three-dimensional points corresponding to the feature points. In the initialization processing, the virtual image G2 may be combined to be displayed, or the virtual image G2 maybe yet to be combined to be displayed at this time point.

When the initialization processing is ended, the control unit 11 determines whether a frame start time point has arrived based on timing processing (Step S3). Each frame has a determined length of time, and hence, in Step S3, the control unit 11 determines whether the current time point acquired by the timing processing is the frame start time point. The control unit 11 further sets the initial value as the counter variable i at this time point, and may count up the counter variable i after the processing of the first display control frame or the second display control frame is finished. The control unit 11 continues the timing processing also in the following processing.

When it is determined that the frame start time point has arrived (Step S3: Y), the control unit 11 determines whether the current frame is a first display control frame or a second display control frame based on the counter variable i (Step S4). In Step S4, the control unit 11 determines that the current frame is a first display control frame when the remainder of the counter variable i divided by k+1 is 1, and that the current frame is a second display control frame otherwise.

When it is determined that the current frame is a first display control frame (Step S4: first display control frame), the control unit 11 determines the position and the orientation of the virtual viewpoint VV based on the feature points in the taken image G1 and detection signals from the sensor unit 19 (Step S5). In Step S5, the control unit 11 estimates the position and the posture of the image taking unit 18 with the use of the SLAM, and updates the virtual viewpoint parameters so as to reflect results of the estimation on the position and the orientation of the virtual viewpoint VV.

Based on a result of the determination in Step S5, the control unit 11 generates the virtual image G2 (Step S6). In Step S6, the control unit 11 generates the virtual image G2 that shows a view of the virtual three-dimensional object VO as seen from the position determined in Step S5 and in the orientation determined in Step S5.

The control unit 11 superimposes the virtual image G2 generated in Step S6 on the taken image G1 to be displayed (Step S7). In Step S7, the control unit 11 sets the layer of the virtual image G2 above the layer of the taken image G1.

Meanwhile, when it is determined in Step S4 that the current frame is a second display control frame (Step S4: second display control frame), the control unit 11 extracts the feature points near the display position of the virtual image G2 (Step S8). In Step S8, the area in which the virtual three-dimensional object VO is displayed or an area within a predetermined distance from the area in which the virtual three-dimensional object VO is displayed, which is shown in the virtual image G2, is set as the extraction target for the feature points. The extracted feature points are stored in the storage unit 12.

The control unit 11 acquires the movement information based on the feature points in the taken image G1 extracted in Step S8 (Step S9). In Step S9, the control unit 11 acquires, as the movement information, the vector information indicating the changes in position of the feature points from the latest one of the first display control frames.

The control unit 11 processes, based on the movement information acquired in Step S9, the virtual image G2 generated based on the latest one of the first display control frames (Step S10). In Step S10, as described with reference to FIG. 8 to FIG. 15, the control unit 11 processes the virtual image G2 by the processing method associated with the movement information.

The control unit 11 determines, based on the movement information acquired in Step S9, the display position of the processed virtual image G2 (Step S11). In Step S11, as described with reference to FIG. 13, the control unit 11 acquires the display position associated with the movement information.

The control unit 11 superimposes the virtual image G2, which has been processed in Step S10, on the taken image G1 to be displayed at the display position determined in Step S11 (Step S12). In Step S12, the control unit 11 sets the layer of the virtual image G2 above the layer of the taken image G1, and displays the virtual image G2 at the display position determined in Step S11 in the layer of the virtual image G2.

The control unit 11 determines whether to perform the initialization processing again based on a predetermined condition (Step S13). The condition for performing the initialization processing again may be any condition that is defined in advance, and may be predetermined time having elapsed from the last initialization processing, an amount of movement of the image taking unit 18 becoming a threshold value or more, or the user performing a predetermined operation, for example.

When it is determined to perform the initialization processing again (Step S13: Y), the processing returns to Step S2, and the initialization processing is executed again. Meanwhile, when it is not determined that the initialization processing is to be performed again (Step S13: N), the control unit 11 determines whether a predetermined end condition is satisfied (Step S14). The end condition may be any condition that is determined in advance to end this processing, and may be the user performing a predetermined operation, for example. When it is determined that the end condition is satisfied (Step S14: Y), this processing is ended. In contrast, when it is not determined that the end condition is satisfied (Step S14: N), the processing returns to Step S3, and waits for the next frame.

According to the display control device 10 described above, instead of executing the complicated processing for each frame, frames on which the simple processing of processing the virtual image G2 is executed are interposed to thin out frames on which the complicated processing is executed, with the result that the processing load on the display control device 10 configured to provide the augmented reality can be reduced while the sense of reality of the augmented reality is maintained.

Moreover, even when the first display control frames repeatedly come a plurality of times, second display control frames are set after each of the first display control frames, with the result that the processing load on the display control device 10 can be reduced.

Further, with the virtual image G2 on which the second display control unit 122 performs processing being as the virtual image G2 generated based on the latest one of the first display control frames, the virtual image G2 closest to the current position and orientation of the image taking unit 18 is processed, and hence the sense of reality of the augmented reality can be increased effectively.

Still further, through the acquisition of the movement information based on the changes of the feature points in the taken images G1, the movement of the image taking unit 18 can be estimated based on the information that can be extracted by the simple processing, and hence the processing load on the display control device 10 can be reduced effectively. Further, with the use of the feature points of the subject of which the images have been actually taken, the accuracy of estimating the movement of the image taking unit 18 can also be increased.

Still further, with the area corresponding to the display position of the virtual image G2 being set as the extraction target for the feature points, the number of feature points to be extracted can be narrowed down, and the processing load on the display control device 10 can be reduced effectively. Further, the virtual image G2 can be processed in accordance with the change of the subject around the virtual image G2, with the result that unnaturalness of the processed virtual image G2 can be reduced, and the sense of reality of the augmented reality can be increased.

Still further, with the second display control unit 122 determining the display position of the virtual image G2 based on the movement information, the subject as well as the virtual image G2 may be moved on the taken image G1, and hence augmented reality with a high sense of reality that appears as if the virtual three-dimensional object VO exists at the predetermined position in the real space RS can be provided with the simple processing.

Still further, with the first display control unit 121 estimating the position and the orientation of the image taking unit 18 further based on the detection signals from the sensor unit 19, the accuracy of estimating the position and the orientation of the image taking unit 18 can be increased.

Still further, with the virtual image G2 being combined to be displayed when the taken images G1 are displayed in real time, augmented reality that appears as if the virtual three-dimensional object VO exists in front of the user can be provided.

Still further, when the images are taken of the inside of the room, the virtual image G2 that shows the virtual three-dimensional object VO indicating furniture is superimposed to be displayed, with the result that the processing load on the display control device 10 in the case of providing augmented reality that appears as if the furniture that does not exist in reality exists in the room can be reduced.

5. Modification Examples

The present invention is not limited to the embodiment described above, and can be modified suitably without departing from the spirit of the present invention.

(1) For example, in the embodiment, the movement information is acquired based on the changes of the feature points in the taken images G1, but other information maybe used as the movement information. For example, when the detection signals from the sensor unit 19 are used, the movement of the image taking unit 18 can be roughly estimated, and hence in the second display control frame, the movement of the image taking unit 18 from the latest one of the first display control frames may be estimated with the use of the detection signals from the sensor unit 19 to process the virtual image G2.

The second display control unit 122 in Modification Example (1) of the present invention may acquire the movement information based on at least one of the detection result of the acceleration sensor 19A, which is capable of detecting the change in position of the image taking unit 18, and the change in detection result of the gyro sensor 19B, which is capable of detecting the change in orientation of the image taking unit 18. In other words, the movement information may include at least one of the change in position of the image taking unit 18, which is detected by the acceleration sensor 19A, and the change in orientation (change in posture) of the image taking unit 18, which is detected by the gyro sensor 19B. In this example, the case in which the movement information includes both of the changes is described, but the movement information may include only one of the changes.

The second display control unit 122 processes the virtual image G2 by the processing method associated with the change in position and the change in orientation of the image taking unit 18. For example, when the movement information indicates that the image taking unit 18 has moved forward, the second display control unit 122 enlarges the virtual image G2. Moreover, for example, when the movement information indicates that the image taking unit 18 has backed up, the second display control unit 122 reduces the virtual image G2. Further, for example, when the movement information indicates that the image taking unit 18 has moved horizontally with respect to the subject, the second display control unit 122 moves the virtual image G2 in a direction corresponding to the movement direction of the image taking unit 18. Still further, for example, when the movement information indicates that the orientation of the image taking unit 18 has changed, the second display control unit 122 performs the projective transformation or the affine transformation on the virtual image G2 to be deformed similarly to the deformation of the subject in the taken images G1.

According to Modification Example (1), through the processing of the virtual image G2 with the use of the detection signals from the sensor unit 19, the estimation of the movement (that is, processing of acquiring the movement information) of the image taking unit 18 from the first display control frame can be performed by simpler processing, and the processing load on the display control device 10 can be reduced effectively.

(2) Moreover, for example, the movement direction and a movement velocity of the image taking unit 18 are not changed abruptly from the preceding movement direction and movement velocity. Therefore, the position and the orientation of the image taking unit 18 in the second display control frame may be estimated based on the changes in position and orientation of the image taking unit 18 in the first display control frames to process the virtual image G2.

In Modification Example (2) of the present invention, the first display control unit 121 records, in the data storage unit 100, a history of results of the estimation of the position and the orientation of the image taking unit 18. For example, the first display control unit 121 records the virtual viewpoint parameters of the virtual viewpoint VV in time sequence in the data storage unit 100.

The second display control unit 122 may acquire the movement information based on the changes in results of the estimation of the position and the orientation of the image taking unit 18 by the first display control unit 121. For example, the second display control unit 122 predicts a movement of the image taking unit 18 from the latest one of the first display control frames based on a change in time series of the virtual viewpoint parameters of the virtual viewpoint VV in a past certain period, and acquires the predicted movement as the movement information.

For example, when the image taking unit 18 makes a uniform motion, the second display control unit 122 acquires the movement information assuming that the image taking unit 18 maintains the uniform motion without any change. Moreover, for example, when the virtual viewpoint VV is accelerated, the second display control unit 122 acquires the movement information assuming that the virtual viewpoint VV maintains the acceleration without any change. Further, for example, when the virtual viewpoint VV is decelerated, the second display control unit 122 acquires the movement information assuming that the virtual viewpoint VV maintains the acceleration without any change. Still further, for example, when the virtual viewpoint VV is stopped, the second display control unit 122 acquires the movement information assuming that the virtual viewpoint VV is stopped without any change. The processing method for the virtual image G2 after the movement information is acquired may be similar to the method described in Modification Example (1).

According to Modification Example (2), through the prediction of the movement of the image taking unit 18 based on the history of movements of the image taking unit 18, the estimation of the movement (that is, processing of acquiring the movement information) of the image taking unit 18 from the first display control frame can be performed by the simpler processing, and the processing load on the display control device 10 can be reduced effectively.

(3) Moreover, for example, the number of second display control frames to be set between the first display control frames may be variable, and a frequency at which the first display control frame comes may be changed based on a predetermined condition. The frequency is the number of first display control frames per unit time, and when the frame rate is N fps, the frequency is a ratio of the first display control frames in N frames, for example.

Figure 15:
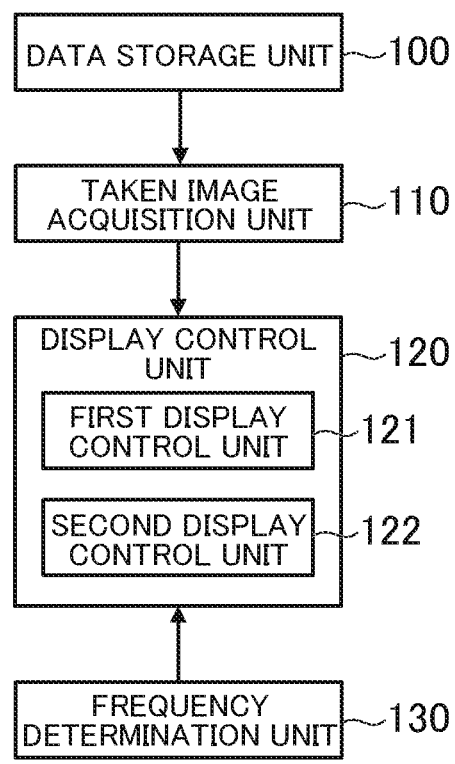
FIG. 15 is a functional block diagram in Modification Example (3) of the present invention.

FIG. 15 is a functional block diagram in Modification Example (3) of the present invention. As illustrated in FIG. 15, in Modification Example (3), a frequency determination unit 130 is implemented. The frequency determination unit 130 is implemented mainly by the control unit 11. The frequency determination unit 130 determines the frequency at which the first display control frame comes based on a predetermined condition. The predetermined condition may be any condition that is determined in advance, and may be a condition regarding an operation by the user, a condition regarding a current processing load, a condition regarding performance of the display control device 10, a condition regarding the movement of the image taking unit 18, or a condition regarding the virtual three-dimensional object VO, for example.

A relationship between the predetermined condition and the frequency of first display control frames may be stored in a form of a mathematical expression or a tabular form in the data storage unit 100, or may be described as a part of program code. The frequency determination unit 130 determines whether the predetermined condition is satisfied, and sets a frequency associated with a satisfied condition. The display control unit 120 determines the repeated pattern of the first display control frames and the second display control frames based on the frequency determined by the frequency determination unit 130, and determines whether the current frame is a first display control frame or a second display control frame.

For example, in the case of the condition regarding the operation by the user, the frequency determination unit 130 determines the frequency of first display control frames to be a frequency specified by the user. In this case, the user may be able to specify a numerical value indicating the frequency of first display control frames per unit time, or may be able to specify a desired frequency from among frequencies of a plurality of stages.

Moreover, for example, in the case of the condition regarding the current processing load, the frequency determination unit 130 sets the frequency of first display control frames lower as the current processing load becomes higher, and sets the frequency of first display control frames higher as the current processing load becomes lower. The processing load may be a CPU usage rate or a memory usage rate, for example. The frequency determination unit 130 may execute a predetermined command (for example, typeperf command or vmstat command) to acquire the processing load.

Further, for example, in the case of the condition regarding the performance of the display control device 10, the frequency determination unit 130 sets the frequency of first display control frames higher as the performance of the display control device 10 becomes higher, and sets the frequency of the first display control frames lower as the performance becomes lower. The performance of the display control device 10 may be a clock cycle or a cache of a CPU, or maybe the type of the memory, for example.

Still further, for example, in the case of the condition regarding the movement of the image taking unit 18, the frequency determination unit 130 sets the frequency of first display control frames higher as the amount of movement of the image taking unit 18 becomes larger, and sets the frequency of first display control frames lower as the amount of movement becomes smaller. The amount of movement of the image taking unit 18 maybe the movement distance or the movement velocity. As described in the embodiment, the amount of movement of the image taking unit 18 may be acquired based on the detection signals from the sensor unit 19, or may be acquired based on the changes of the feature points in the taken images G1.

Still further, for example, in the case of the condition regarding the virtual three-dimensional object VO, for example, the frequency determination unit 130 sets the frequency of first display control frames higher as the number of vertices of the virtual three-dimensional object VO becomes smaller, and sets the frequency of first display control frames lower as the number of vertices becomes larger. Moreover, for example, when a plurality of virtual three-dimensional objects VO can be arranged in the virtual space VS, the frequency determination unit 130 sets the frequency of first display control frames lower as the number of virtual three-dimensional objects VO becomes larger, and sets the frequency of first display control frames higher as the number becomes smaller. Further, in contrast, the frequency determination unit 130 may set the frequency of first display control frames higher as the number of virtual three-dimensional objects VO becomes smaller, and set the frequency of first display control frames lower as the number becomes larger.

According to Modification Example (3), the first display control frames of the frequency corresponding to the predetermined condition are set, with the result that the reduction in processing load on the display control device 10 and the increase in sense of reality of the augmented reality can be more balanced.

(4) Moreover, for example, a plurality of virtual three-dimensional objects may be arranged in the virtual space VS, and the frequency at which the first display control frames come may be variable for each of the virtual three-dimensional objects VO.

Figure 16:
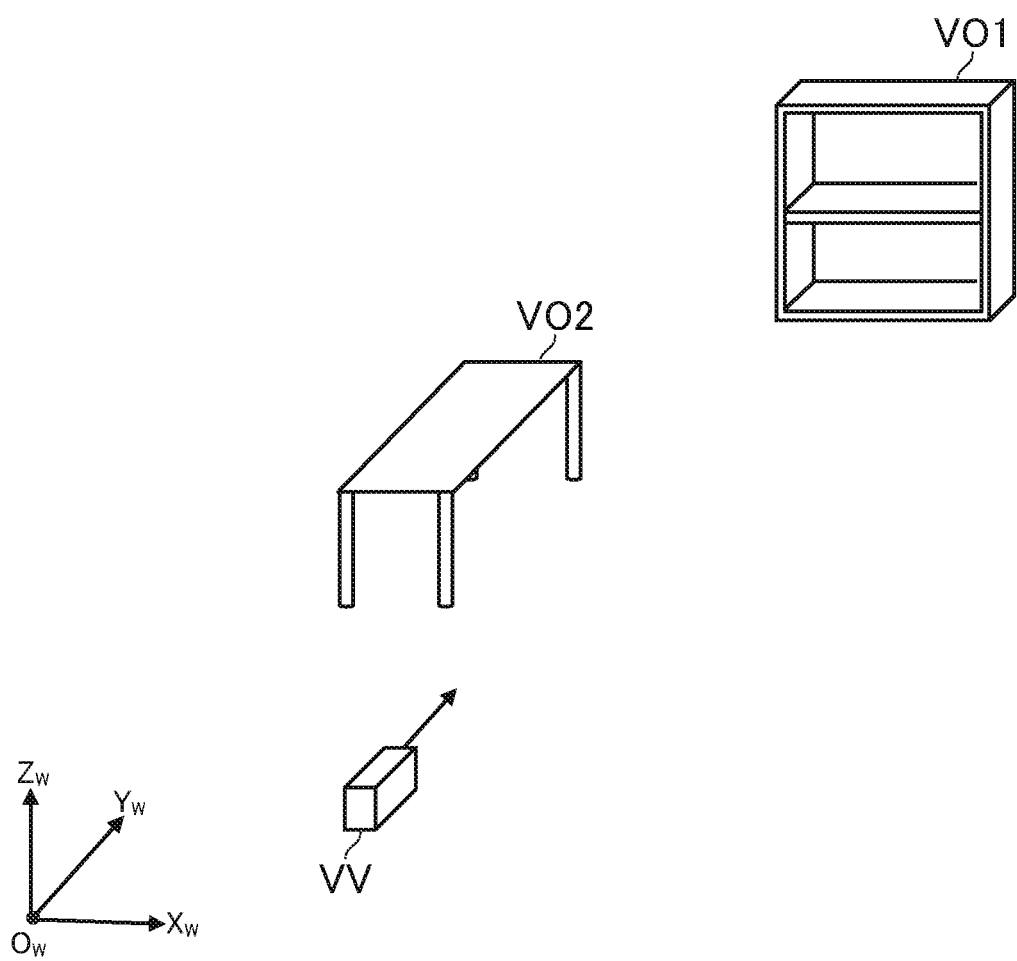
FIG. 16 is an explanatory diagram of processing details of Modification Example (4) of the present invention.

FIG. 16 is an explanatory diagram of processing details of Modification Example (4) of the present invention. In the example illustrated in FIG. 16, a virtual three-dimensional object VO1 representing a bookshelf, and a virtual three-dimensional object VO2 representing a desk are arranged in the virtual space VS. As illustrated in FIG. 16, the virtual three-dimensional object VO1 is arranged at a position that is farther from the virtual viewpoint VV than the virtual three-dimensional object VO2 is.

For example, the first display control unit 121 may generate the virtual image G2 for each of the virtual three-dimensional objects VO. Therefore, in the example of FIG. 16, the first display control unit 121 may generate a virtual image G2 of the virtual three-dimensional object VO1 and a virtual image G2 of the virtual three-dimensional object VO2. The virtual images G2 and G3 may be the same layer, or different layers. It should be noted, however, that the layers of the virtual images G2 and G3 are above the layer of the taken image G1.

Alternatively, for example, the second display control unit 122 processes the virtual image G2 generated for each of the virtual three-dimensional objects VO, and combines the processed virtual image G2 with the taken image G1 to be displayed. The processing method for the virtual images G2 and the method of combining the processed virtual image G2 with the taken image G1 themselves may be similar to those described in the embodiment.

The frequency determination unit 130 in Modification Example (4) determines a frequency at which the first display control frames come for each of the virtual three-dimensional objects VO based on a position of the virtual three-dimensional object VO. For example, the frequency determination unit 130 sets the frequency of first display control frames higher as the distance between the virtual three-dimensional object VO and the virtual viewpoint VV becomes shorter, and sets the frequency of first display control frames lower as the distance becomes longer. In the example of FIG. 16, the frequency determination unit 130 sets the frequency of first display control frames of the virtual three-dimensional object VO1 lower than the frequency of second display control frames of the virtual three-dimensional object VO2. The display control unit 120 determines whether the current frame is a first display control frame or a second display control frame for each of the virtual three-dimensional objects VO based on the frequency determined by the frequency determination unit 130.

According to Modification Example (4), the frequency of first display control frames is variable based on the position of the virtual three-dimensional object VO. Therefore, when the distance from the virtual viewpoint VV is short, and hence a change in shape tends to occur such that a displacement from the subject is easily seen, processing with high accuracy can be performed frequently. When the distance from the virtual viewpoint VV is long, and hence a change in shape hardly occurs such that a displacement from the subject is hardly seen, the processing with high accuracy can be thinned out to execute simple processing. As a result, the reduction in processing load on the display control device 10 and the increased sense of reality of the augmented reality can be more balanced.

(5) Further, for example, it is not required that the virtual image G2 have the same size as that of the taken image G1, and the virtual image G2 maybe smaller or larger than the taken image G1. The first display control unit 121 in Modification Example (5) of the present invention generates the virtual image G2 that is larger than the taken image G1. The virtual image G2 may have a size that can encompass the taken image G1.

The second display control unit 122 can process a portion of the virtual image G2 that is not displayed in the display control performed by the first display control unit 121 to be displayed. For example, the second display control unit 122 can reduce or move the virtual image G2 to combine the area that has not been displayed with the taken image G1 to be displayed.

For example, when the image taking unit 18 is directed upward, the second display control unit 122 moves the virtual image G2 downward to display an upper area of the virtual image G2 that has not been displayed. Similarly, when the image taking unit 18 is directed downward, to the right, or to the left, the second display control unit 122 moves the virtual image G2 upward, to the left, or to the right to display an area of the virtual image G2 that has not been displayed.

According to Modification Example (5), even when the image taking unit 18 is moved to take the taken image G1 of a portion of which images have not been taken, the portion of the virtual image G2 that has not been displayed in the first display control frame can be displayed by the simple processing, with the result that the sense of reality of the augmented reality can be increased effectively while reducing the processing load on the display control device 10.

(6) Further, for example, in the embodiment, the description has been given of the case of using the sensor unit 19 to estimate the position and the orientation of the image taking unit 18, but the sensor unit 19 may not be particularly used. Moreover, for example, the detection results from the sensor unit 19 may be used for each of the first display control frames, or may be used only during the initialization processing, and not in the first display control frames. Further, the description has been given of the case in which one image taking unit 18 (monocular camera) is used. However, a plurality of image taking units 18 (compound-eye camera) may be used, or an image taking unit 18 (RGB-D camera) including a depth sensor may be used. The depth sensor may be any sensor capable of detecting the distance from the subject, and may adopt a method using an infrared ray or microwave, for example. With the image taking unit 18 including the depth sensor, the distance from the feature points can be directly calculated.

Still further, for example, in the embodiment, the description has been given of the case in which the first display control unit 121 adjusts the position and the orientation of the virtual viewpoint VV. However, it is only required to adjust a relative position of the virtual viewpoint VV with respect to the virtual three-dimensional object VO, and the position and the orientation of the virtual three-dimensional object VO may be changed. In other words, the first display control unit 121 may move or rotate the virtual three-dimensional object VO without changing the position and the orientation of the virtual viewpoint VV. In addition, for example, the first display control unit 121 may change the positions and the orientations of both the virtual viewpoint VV and the virtual three-dimensional object VO.

Still further, for example, the real space RS may be any space, and is not limited to the inside of the room, which has been described in the embodiment. The real space RS may be outdoors, and may be an event venue, a parking lot, or a stadium, for example. Moreover, for example, the virtual three-dimensional object VO may be any three-dimensional model to be combined in the augmented reality, and is not limited to the furniture, which has been described in the embodiment. The virtual three-dimensional object may represent an object arranged outdoors, and may be a car, a motorcycle, or other vehicles, a person, an animal, or other characters, clothes, shoes, or other clothing, a tree, grass, or other plants, a fence, or a sign, for example. Further, for example, the virtual three-dimensional object is not limited to a static object, but may be a movable object. In this case, motion data defining changes of vertices of the virtual three-dimensional object is stored in the data storage unit, and the display control unit 120 may play back the motion data to move the virtual three-dimensional object.

Still further, for example, it is not required that the display control device 10 include the image taking unit 18, and the taken image acquisition unit 110 may acquire taken images G1 taken by an image taking unit 18 that is not included in the display control device 10. In this case, the sensor unit 19 is not included in the display control device 10, but may be included in a casing of the image taking unit 18. Moreover, for example, the display control device 10 may be implemented by a server computer, and in this case, the display control device 10 does not include the display unit 15, and may combine the taken image G1 and the virtual image G2 to be displayed on a display unit of a terminal connected to the display control device 10 via a network.

The invention claimed is:

1. A display control device, comprising at least one processor configured to:
    acquire taken images taken at a predetermined frame rate by a camera, which is movable in a real space;
    execute first processing of estimating a current position and orientation of the camera based on the taken images, and combine a virtual image with one of the taken images to be displayed, the virtual image showing a view of a virtual three-dimensional object as seen from a virtual viewpoint based on a result of the estimation; and
    acquire, in a frame subsequent to a frame on which the virtual image and the one of the taken images have been combined, instead of executing the first processing for each frame, movement information on a movement of the camera, process the virtual image based on the movement information by two-dimensional processing, and combine the processed virtual image with another one of the taken images to be displayed,
    wherein the at least one processor thins out frames on which the first processing is executed.

2. The display control device according to claim 1,
    wherein first display control frames are repeatedly received for a plurality of times, the first display control frames are frames on which the virtual image and the one of the taken images are combined, and
    wherein at least one second display control frame is set after each of the first display control frames, the at least one second display control frame is a frame on which the processed virtual image and the another one of the taken images are combined.

3. The display control device according to claim 2, wherein the at least one processor is configured to process the virtual image generated based on a latest one of the first display control frames, which repeatedly come a plurality of times, based on the movement information on a movement of the camera from the latest one of the first display control frames.

4. The display control device according to claim 1, wherein the at least one processor is configured to acquire the movement information based on a change of a feature point in the taken images.

5. The display control device according to claim 4, wherein the at least one processor is configured to set an area corresponding to a display position of the virtual image in the taken images as an extraction target for the feature point.

6. The display control device according to claim 1, wherein the at least one processor is configured to acquire the movement information based on at least one of a detection result of a sensor configured to detect a change in position of the camera, and a detection result of a sensor configured to detect a change in orientation of the camera.

7. The display control device according to claim 1,
    wherein first display control frames are repeatedly received a plurality of times, the first display control frames are frames on which the virtual image and the one of the taken images are combined,
    wherein at least one second display control frame is set after each of the first display control frames, the at least one second display control frame is a frame on which the processed virtual image and the another one of the taken images are combined, and
    wherein the at least one processor is configured to acquire the movement information based on changes in estimation results of a position and an orientation of the camera.

8. The display control device according to claim 1, wherein the at least one processor is configured to further determine a display position of the processed virtual image based on the movement information, and display the processed virtual image at the display position.

9. The display control device according to claim 1, wherein the at least one processor is configured to estimate the current position and orientation of the camera based further on at least one of a detection result of a sensor configured to detect a change in position of the camera, and a detection result of a sensor configured to detect a change in orientation of the camera.

10. The display control device according to claim 1,
    wherein the at least one processor is configured to:
        acquire in real time the taken images taken by the camera,
        combine one of the taken images acquired in real time and the virtual image with each other so that the combined image can be displayed, and
        combine another one of the taken images acquired in real time and the processed virtual image with each other so that the combined image can be displayed.

11. The display control device according to claim 1,
    wherein first display control frames are repeatedly received a plurality of times, the first display control frames which are frames on which the virtual image and the one of the taken images are combined,
    wherein at least one second display control frame is set after each of the first display control frames, and a number of second display control frames is variable, the at least second display control frame is a frame on which the processed virtual image and the another one of the taken images are combined, and
    wherein the at least one processor is configured to determine a frequency at which the first display control frames come based on a predetermined condition.

12. The display control device according to claim 11,
    wherein a plurality of the virtual three-dimensional objects are arranged in a virtual space,
    wherein the frequency at which the first display control frames come is variable for each of the virtual three-dimensional objects, and
    wherein the at least one processor is configured to determine the frequency at which the first display control frames come for each of the virtual three-dimensional objects based on a position of the each of the virtual three-dimensional objects.

13. The display control device according to claim 1,
    wherein the at least one processor is configured to generate the virtual image that is larger than each of the taken images, and
    wherein the at least one processor is enabled to process and display a portion of the virtual image that is not displayed.

14. The display control device according to claim 1,
    wherein the real space is inside of a room,
    wherein the taken images are taken of a view of the inside of the room, wherein the virtual three-dimensional object is virtual furniture, and wherein the virtual image is an image that shows a view of the virtual furniture as seen from the virtual viewpoint.

15. A display control method, comprising:

acquiring taken images taken at a predetermined frame rate by a camera, which is movable in a real space;

executing first processing of estimating a current position and orientation of the camera based on the taken images, and combining a virtual image with one of the taken images to be displayed, the virtual image showing a view of a virtual three-dimensional object as seen from a virtual viewpoint based on a result of the estimation; and acquiring, in a frame subsequent to a frame on which the virtual image and the one of the taken images have been combined, instead of executing the first processing for each frame, movement information on a movement of the camera, processing the virtual image based on the movement information by two-dimensional processing, and combining the processed virtual image with another one of the taken images to be displayed, wherein the frames on which the first processing is executed are thinned out.

16. A non-transitory computer-readable information storage medium for storing a program for causing a computer to function as:

acquire taken images taken at a predetermined frame rate by a camera, which is movable in a real space;

execute first processing of estimating a current position and orientation of the camera based on the taken images, and combine a virtual image with one of the taken images to be displayed, the virtual image showing a view of a virtual three-dimensional object as seen from a virtual viewpoint based on a result of the estimation; and acquire, in a frame subsequent to a frame on which the virtual image and the one of the taken images have been combined, instead of executing the first processing for each frame, movement information on a movement of the camera, process the virtual image based on the movement information by two-dimensional processing, and combine the processed virtual image with another one of the taken images to be displayed, wherein the frames on which the first processing is executed are thinned out.

* * * * *